US011949842B2

(12) United States Patent
Kobashi et al.

(10) Patent No.: US 11,949,842 B2
(45) Date of Patent: Apr. 2, 2024

(54) COLOR MANAGEMENT SYSTEM, INFORMATION PROCESSING APPARATUS, AND STORAGE MEDIUM

(71) Applicant: CANON KABUSHIKI KAISHA, Tokyo (JP)

(72) Inventors: Kazufumi Kobashi, Tokyo (JP); Satoshi Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/185,950

(22) Filed: Mar. 17, 2023

(65) Prior Publication Data

US 2023/0344951 A1 Oct. 26, 2023

(30) Foreign Application Priority Data

Apr. 26, 2022 (JP) ................. 2022-072674

(51) Int. Cl.
*H04N 1/60* (2006.01)
*G01J 3/52* (2006.01)
*H04N 1/00* (2006.01)

(52) U.S. Cl.
CPC .............. *H04N 1/6044* (2013.01); *G01J 3/52* (2013.01); *H04N 1/00427* (2013.01)

(58) Field of Classification Search
CPC ...... H04N 1/6044; H04N 1/00427; G01J 3/52
See application file for complete search history.

(56) References Cited

U.S. PATENT DOCUMENTS

2012/0206745 A1* 8/2012 Shibuya ............... H04N 1/6033
358/1.9
2013/0003090 A1* 1/2013 Sato ........................ H04N 1/60
358/1.9

FOREIGN PATENT DOCUMENTS

JP 2013-167819 8/2013
JP 2019-003256 1/2019

* cited by examiner

*Primary Examiner* — Quang N Vo
(74) *Attorney, Agent, or Firm* — Venable LLP

(57) ABSTRACT

In a color management system including a server and an image forming apparatus, the server stores information of a colorimetric sensor and paper information corresponding to the colorimetric sensor, obtains information of a colorimetric sensor mounted in the image forming apparatus, designates paper to use when executing a color adjustment process of the image forming apparatus, and, based on the stored paper information, selects a colorimetric sensor of the image forming apparatus corresponding to the designated paper. The image forming apparatus comprises causes a printer engine to print a chart on the designated paper in accordance with a color adjustment job for executing the color adjustment process, and measures a colorimetric value of the printed chart using the selected colorimetric sensor.

19 Claims, 28 Drawing Sheets

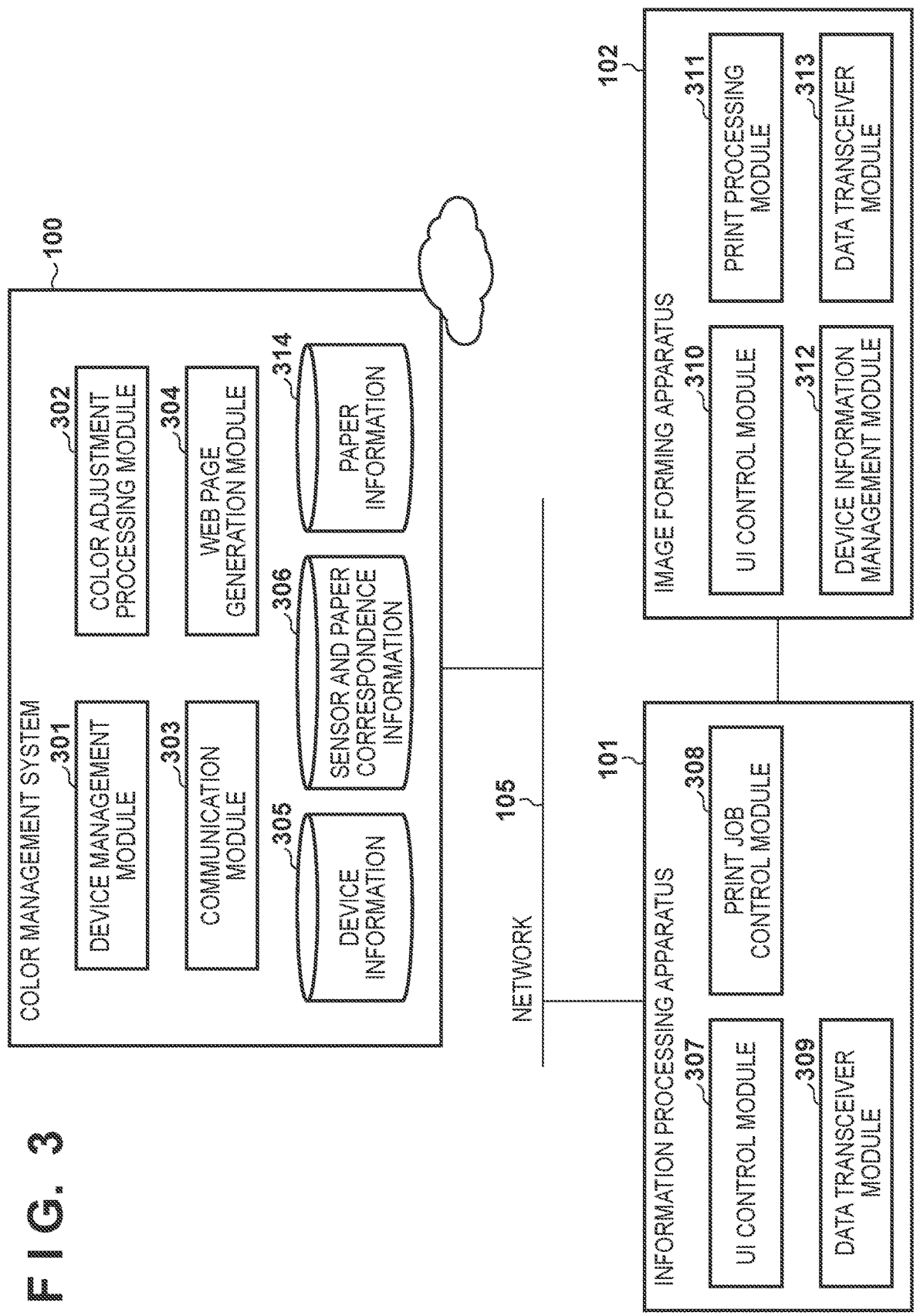

FIG. 5A

COLOR ADJUSTMENT FUNCTION

| | | |
|---|---|---|
| TARGET DEVICE: | Printer - B ▼ | ~501 |
| ADJUSTMENT TYPE: | COLOR INSPECTION ▼ | ~502 |
| TARGET PROFILE: | Japan Color 2011 ▼ | ~503 |
| PAPER TO USE: | A4 : PLAIN PAPER 80gsm ▼ | ~504 |
| COLORIMETRIC METHOD: | COLORIMETRIC SENSOR B ▼ | ~505 |

506     507
OK     CANCEL

FIG. 5B

COLORIMETRIC METHOD:
- COLORIMETRIC SENSOR B ▼ ~505
- COLORIMETRIC SENSOR A [UNUSABLE] ~508
- COLORIMETRIC SENSOR B
- X-XXX ix Pro2
- X-XXX ix Pro3

FIG. 6A

COLOR ADJUSTMENT FUNCTION

| | | |
|---|---|---|
| TARGET DEVICE: | Printer - B ▼ | ~501 |
| ADJUSTMENT TYPE: | COLOR INSPECTION ▼ | ~502 |
| TARGET PROFILE: | Japan Color 2011 ▼ | ~503 |
| PAPER TO USE: | A4 : PLAIN PAPER 80gsm ▼ | ~504 |
| COLORIMETRIC METHOD: | COLORIMETRIC SENSOR A ▼ | ~505 |

506 — OK  507 — CANCEL

FIG. 6B

COLORIMETRIC METHOD:
- COLORIMETRIC SENSOR A ▼ ~505
- COLORIMETRIC SENSOR A
- COLORIMETRIC SENSOR B

FIG. 6C

PAPER TO USE:
- A4 : PLAIN PAPER 80gsm ▼ ~504
- A4 : PLAIN PAPER 80gsm [UNUSABLE] ~510
- A3 : PLAIN PAPER 128gsm ~509
- A3 : THICK PAPER 300gsm
- A3 : BOND PAPER 180gsm [UNUSABLE]

FIG. 6D

PAPER TO USE:
- A4 : PLAIN PAPER 80gsm ▼ ~504
- A4 : PLAIN PAPER 80gsm [UNUSABLE]
- A3 : PLAIN PAPER 128gsm [RECOMMENDED] ~511
- A3 : THICK PAPER 300gsm [RECOMMENDED]
- A3 : BOND PAPER 180gsm [UNUSABLE]

FIG. 7A

| | DEVICE CONFIGURATION | |
|---|---|---|
| | COLORIMETRIC SENSOR A | COLORIMETRIC SENSOR B |
| Printer-A | ○ | × |
| Printer-B | ○ | ○ |
| ... | ... | ... |

FIG. 7B

| | PAPER SIZE | | | | | | | | | | |
|---|---|---|---|---|---|---|---|---|---|---|---|
| | A5 | A4 | A3 | B5 | B4 | Letter | 11x17 | 12x18 | 13x19 | SRA3 | ... |
| COLORIMETRIC SENSOR A | × | × | ○ | × | × | ○ | ○ | ○ | ○ | ○ | ... |
| COLORIMETRIC SENSOR B | × | ○ | ○ | ○ | ○ | ○ | ○ | ○ | ○ | ○ | ... |

FIG. 7C

| | SHEET: GRAMMAGE | | | | |
|---|---|---|---|---|---|
| | PLAIN PAPER | THICK PAPER | COATED PAPER | BOND PAPER | ... |
| COLORIMETRIC SENSOR A | 64-300 | 64-300 | 70-300 | × | ... |
| COLORIMETRIC SENSOR B | 52-400 | 52-400 | 70-400 | 64-105 | ... |

FIG. 7D

| | PAPER SIZE | | | | |
|---|---|---|---|---|---|
| | A5 | A4 | A3 | B5 | ... |
| COLORIMETRIC SENSOR A | × | × | 76 PATCHES | × | ... |
| COLORIMETRIC SENSOR B | × | 144 PATCHES | 288 PATCHES | 128 PATCHES | ... |

FIG. 7E

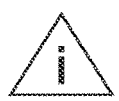

THERE IS NO INLINE COLORIMETRIC SENSOR THAT CAN PERFORM COLORIMETRY USING SELECTED PAPER

COLOR ADJUSTMENT FUNCTION

| | | |
|---|---|---|
| TARGET DEVICE: | Printer - B ▼ | 501 |
| ADJUSTMENT TYPE: | COLOR INSPECTION ▼ | 502 |
| COLORIMETRY MODE: | SPEED PRIORITY ▼ | 1201 |
| TARGET PROFILE: | Japan Color 2011 ▼ | 503 |
| PAPER TO USE: | A4 : PLAIN PAPER 80gsm ▼ | 504 |
| COLORIMETRIC METHOD: | COLORIMETRIC SENSOR A ▼ | 505 |

506 — OK    507 — CANCEL

FIG. 12B

| | COLORIMETRY MODE | |
|---|---|---|
| | STANDARD | SPEED PRIORITY |
| COLORIMETRIC SENSOR A | 2 | 1 |
| COLORIMETRIC SENSOR B | 1 | 2 |

FIG. 14A

| | DEVICE CONFIGURATION | | PAPER FEED SOURCE INFORMATION | | |
|---|---|---|---|---|---|
| | COLORIMETRIC SENSOR A | COLORIMETRIC SENSOR B | CASSETTE 1 | CASSETTE 2 | ... |
| Printer-A | ○ | × | A4: PLAIN PAPER, 80 gsm | A4: COATED, 80 gsm | ... |
| Printer-B | ○ | ○ | A4: PLAIN PAPER, 80 gsm | A3: COATED, 80 gsm | ... |
| ... | ... | ... | ... | ... | ... |

FIG. 14B

COLOR ADJUSTMENT FUNCTION

| | | |
|---|---|---|
| TARGET DEVICE: | Printer - B ▼ | 501 |
| ADJUSTMENT TYPE: | COLOR INSPECTION ▼ | 502 |
| COLORIMETRY MODE: | SPEED PRIORITY ▼ | 1201 |
| TARGET PROFILE: | Japan Color 2011 ▼ | 503 |
| PAPER TO USE: | A4 : PLAIN PAPER, 80 gsm, [CASSETTE 1] ▼ | 1401 |
| COLORIMETRIC METHOD: | COLORIMETRIC SENSOR A ▼ | 505 |

506 OK    507 CANCEL

FIG. 14C

PAPER TO USE: A4 : PLAIN PAPER, 80 gsm [CASSETTE 1] ▼ —1401
- A4 : PLAIN PAPER, 80 gsm [CASSETTE 1]
- A3 : COATED 80 gsm [CASSETTE 2] —1402
- A3 : PLAIN PAPER 128 gsm [CASSETTE 3]
- A4 : COATED 180 gsm [×] —1403

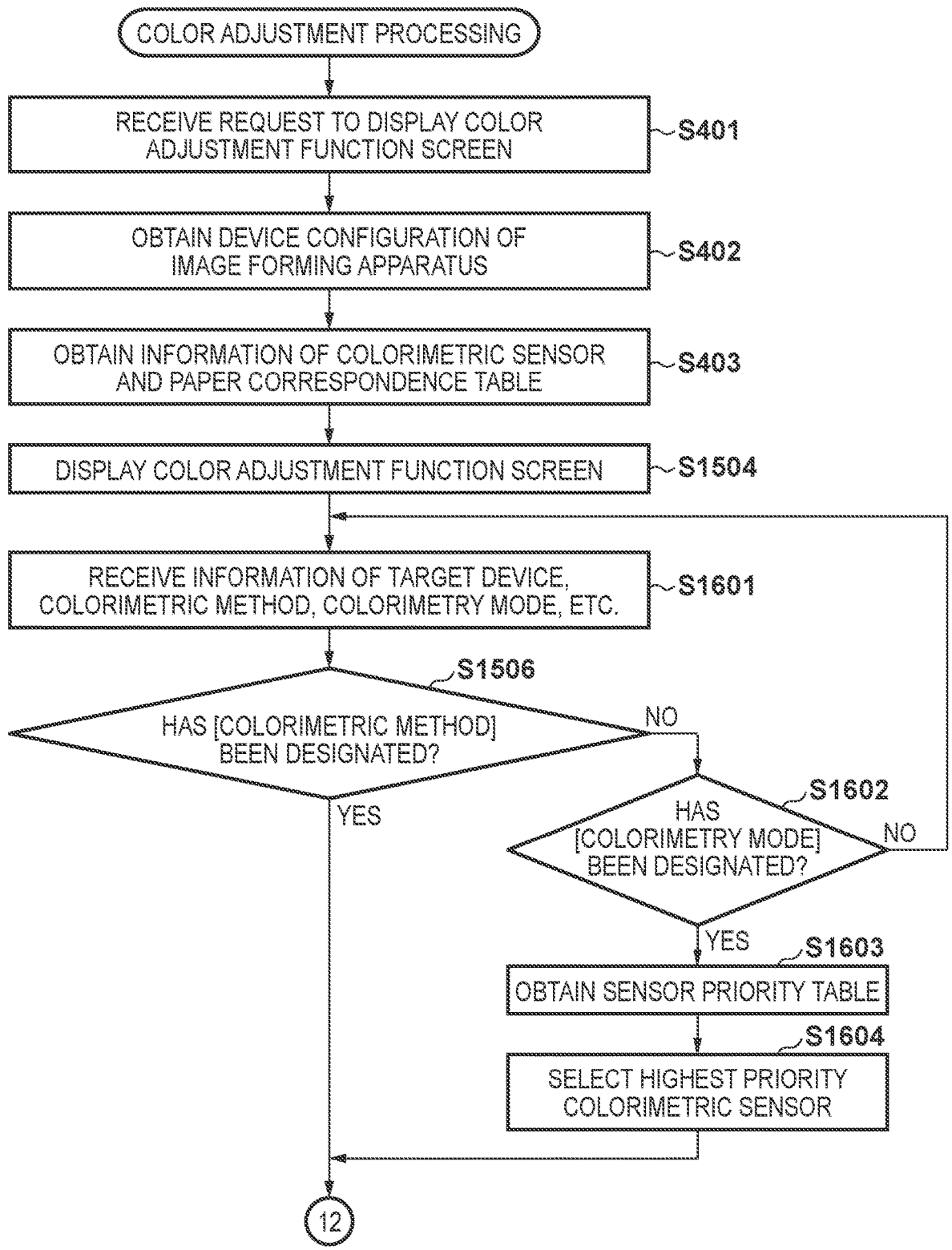
F I G. 16A

FIG. 17A

| PAPER NAME | PAPER ATTRIBUTE | | | |
|---|---|---|---|---|
| | TYPE | GRAMMAGE | SIZE | ... |
| A4: PLAIN PAPER 80 gsm | PLAIN PAPER | 80 | A4 | ... |
| A3: PLAIN PAPER 128 gsm | PLAIN PAPER | 128 | A3 | |
| A3: THICK PAPER, 300 gsm | THICK PAPER | 300 | A3 | |
| A3: BOND PAPER, 180 gsm | BOND PAPER | 180 | A3 | |

FIG. 17B

| | COLORIMETRY MODE | | PAPER REDUCTION MODE | |
|---|---|---|---|---|
| | STANDARD | SPEED PRIORITY | ENABLE | DISABLE |
| COLORIMETRIC SENSOR A | 2 | 1 | 2 | 1 |
| COLORIMETRIC SENSOR B | 1 | 2 | 1 | 1 |

FIG. 17C

| | DEVICE CONFIGURATION | | PAPER FEED SOURCE INFORMATION | | |
|---|---|---|---|---|---|
| | COLORIMETRIC SENSOR A | COLORIMETRIC SENSOR B | CASSETTE 1 | CASSETTE 2 | ... |
| Printer-A | ○ | × | A4: PLAIN PAPER, 80 gsm | A4: COATED, 80 gsm | ... |
| Printer-B | ○ | ○ | A3: BOND PAPER, 180 gsm | A3: PLAIN PAPER, 128 gsm | ... |
| ... | | | | | |

FIG. 17D

PAPER TO USE: A3: BOND PAPER 180 gsm [CASSETTE 1] [UNUSABLE] ▼ ~504
A3: BOND PAPER 180 gsm [CASSETTE 1] [UNUSABLE] ~1706
A3 : PLAIN PAPER 128 gsm [CASSETTE 2] ~1701

FIG. 17E

PAPER REDUCTION MODE
● ON ~1702    ○ OFF ~1703
1704~ [OK]    [CANCEL] ~1705

COLOR MANAGEMENT SYSTEM, INFORMATION PROCESSING APPARATUS, AND STORAGE MEDIUM

BACKGROUND OF THE INVENTION

Field of the Invention

The present invention relates to a color management system, an information processing apparatus, and a storage medium.

Description of the Related Art

In commercial printing, it is necessary to accurately reproduce a color appearance in printing by a printing device. Therefore, at the printing site, the state of the color appearance of a printed matter by the printing device is periodically inspected, and when the printing device is in a state in which an exact color appearance cannot be reproduced, the printing device is made to be able to reproduce the correct color appearance by adjusting the state of the color appearance printed by the printing device.

As a method for inspecting the color appearance, there is a method in which a color chart in which several color patches are printed is read by a colorimeter, and the read information is compared with a printing industry color standard/reference or a color standard/reference established independently by a printing company. Conventionally, a user typically obtains color information by operating a colorimeter in accordance with color patches of an outputted color chart. Therefore, an operator having a certain degree of skill is needed because accurate color information cannot be obtained unless the colorimeter is operated according to a precise procedure.

As a technique for improving the efficiency of such colorimetry work, a technique in which an inline sensor capable of colorimetry is mounted in an image forming apparatus and a colorimetry process is automatically executed in parallel with a printing process of a color chart has been developed by different companies. However, since such inline sensors are disposed in the image forming apparatus, this technique is limited to the sheet conveyance path. Therefore, there is a limitation on the paper that can be handled as compared with the manual colorimeter described above. Accordingly, Japanese Patent Laid-Open No. 2019-003256 has described a technique in which a user can select whether to use a manual colorimeter or an inline sensor when performing color chart colorimetry. Japanese Patent Laid-Open No. 2013-167819 describes a technique of feeding paper from an alternative tray different from a paper feed tray set as a main printing paper feed source when performing color measurement by an inline sensor.

According to the technique described in Japanese Patent Laid-Open No. 2019-003256, it is possible to designate whether color chart colorimetry is to be performed manually or by an inline sensor at the time of printing of the color chart. However, in recent years, inline sensors are mounted in an optionally mounted unit in addition to in the main body of the image forming apparatus, making it possible to perform colorimetry in which the inline sensor to be used is selected from a plurality of inline sensors. In this case, since the influence of the conveyance path is different depending on the position where the inline sensor is disposed, the paper (size/grammage) that can be handled by respective inline sensors is different. In addition, the speed of colorimetry and colorimetric accuracy of each of the inline sensors differ depending on the colorimetry method (fixed type/movable type) and number of sensors (one/a plurality of sensors). Further, since the number of patches that can be arranged in the chart differs depending on the inline sensor, the number of sheets required for printing the chart also differs. Therefore, when a user prints a color chart, the user must designate an appropriate inline sensor for the paper to be used for printing; however, it is difficult to know what paper each inline sensor is compatible with in advance. If an incompatible inline sensor is designated when making an instruction to print a color chart, a print error will occur, and the print instruction will need to be given again, which leads to a decrease in user work efficiency.

In addition, when a line sensor to be used is selected from a plurality of inline sensors when performing a color measurement, the user needs to select an inline sensor in consideration of the speed of colorimetry, the colorimetric accuracy, and the number of sheets on which a chart is to be printed, and designate paper appropriate for the selected inline sensor. However, it is difficult to know what paper is compatible with each inline sensor in advance. If incompatible paper is designated when making an instruction to print a color chart, a print error will occur, and the print instruction will need to be given again, which leads to a decrease in user work efficiency.

SUMMARY OF THE INVENTION

Embodiments of the present disclosure eliminate the above-mentioned issues with conventional technology.

A feature of embodiments of the present disclosure provides a technique for improving efficiency in colorimetry work by automatically selecting a compatible colorimetric sensor in accordance with paper to be used in color adjustment processing.

According to embodiments of the present disclosure, there is provided a color management system including a server and an image forming apparatus, the server comprising one or more first memories storing instructions; and one or more first processors configured to execute the instructions to: store information of a colorimetric sensor and paper information corresponding to the colorimetric sensor; obtain information of a colorimetric sensor mounted in the image forming apparatus; designate paper to use when executing a color adjustment process of the image forming apparatus; and based on the stored paper information, select a colorimetric sensor of the image forming apparatus corresponding to the designated paper, and the image forming apparatus comprises at least one colorimetric sensor; a printer engine; one or more second memories storing instructions; and one or more second processors configured to execute the instructions to: cause the printer engine to print a chart on the designated paper in accordance with a color adjustment job for executing the color adjustment process; and measure a colorimetric value of the printed chart using the selected colorimetric sensor.

According to embodiments of the present disclosure, there is provided an information processing apparatus operable to control a color adjustment process by an image forming apparatus having a plurality of colorimetric sensors, the information processing apparatus comprising one or more memories storing instructions; and one or more processors configured to execute the instructions to: store information of a colorimetric sensor and paper information corresponding to the colorimetric sensor; obtain information of the plurality of colorimetric sensors, which are mounted in the image forming apparatus; designate paper to use when executing the color adjustment process of the image forming apparatus; and based on the stored paper information, select a colorimetric sensor of the image forming apparatus corresponding to the designated paper.

According to embodiments of the present disclosure, there is provided an information processing apparatus operable to control a color adjustment process by an image forming apparatus having a plurality of colorimetric sensors, the information processing apparatus comprising one or more memories storing instructions; and one or more processors configured to execute the instructions to: store information of a colorimetric sensor and paper information corresponding to the colorimetric sensor; designate a colorimetric sensor to use when executing the color adjustment process of the image forming apparatus; and based on the stored paper information, select paper to use in the color adjustment process using the designated colorimetric sensor.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 3 is a functional block diagram for describing a software configuration of a CMS, the information processing apparatus, and the image forming apparatus according to the first embodiment.

FIG. 5A is a diagram illustrating an example of a color adjustment function screen displayed by a client according to the first embodiment.

FIG. 5B is a diagram illustrating a display example of a colorimetric method control.

FIG. 6A is a diagram illustrating an example of a color adjustment function screen according to a fifth embodiment.

FIG. 6B is a diagram illustrating an opened list of a colorimetric method control.

FIG. 6C is a diagram illustrating an opened list of a control for paper to be used.

FIG. 6D is a diagram illustrating an opened list of a control for paper to be used in a seventh embodiment.

FIG. 7A is a diagram illustrating an example of a device configuration table.

FIG. 7B is a diagram illustrating an example of sensor and paper correspondence information.

FIG. 7C is a diagram illustrating paper types/grammages supported by the colorimetric sensors.

FIG. 7D is a diagram illustrating a number of patches relation table according to the seventh embodiment.

FIG. 7E is a diagram illustrating an example of a warning screen.

FIG. 12A is a diagram illustrating an example of a color adjustment function screen displayed by a client according to the third embodiment.

FIG. 12B is a diagram illustrating an example of a sensor priority table according to the third and sixth embodiments.

FIG. 14A is a diagram illustrating an example of a device configuration table according to the fourth embodiment.

FIG. 14B is a diagram illustrating an example of a color adjustment function screen displayed by a client according to the fourth embodiment.

FIG. 14C is a diagram illustrating an opened list of a control for paper to be used.

FIGS. 16A and 16B are flowcharts for describing a process for executing a color adjustment job by the color management system according to the sixth embodiment.

FIG. 17A is a diagram illustrating an example of paper information according to the fifth embodiment.

FIG. 17B is a diagram illustrating an example of a sensor priority table according to a seventh embodiment.

FIG. 17C is a diagram illustrating an example of a device information table according to an eighth embodiment.

FIG. 17D is a diagram illustrating an opened list of a control for paper to be used in the eighth embodiment.

FIG. 17E is a diagram illustrating an example of a paper reduction mode selection screen according to the seventh embodiment.

DESCRIPTION OF THE EMBODIMENTS

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure.

First Embodiment

Figure 1:
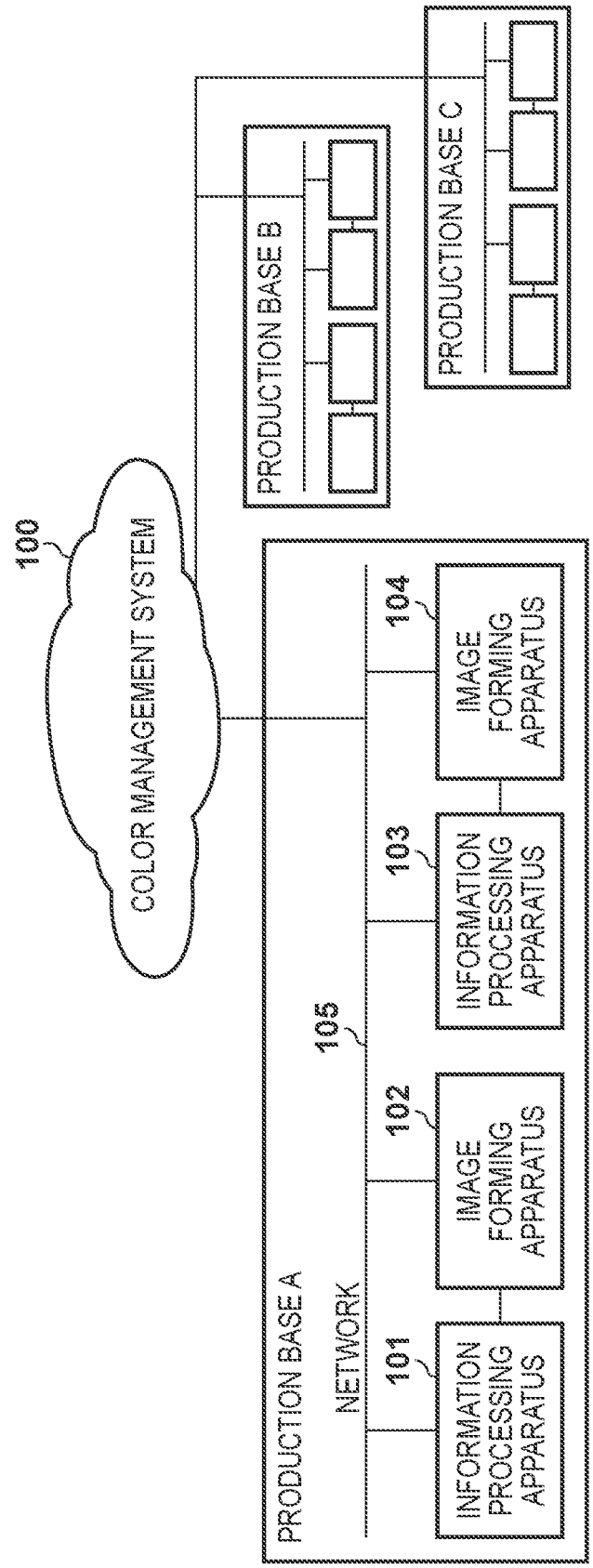
FIG. 1 is a diagram illustrating a configuration of a color management system according to a first embodiment of the present invention.

FIG. 1 is a diagram illustrating a configuration of a color management system according to a first embodiment of the present invention.

The color management system includes a Color Management System (hereinafter, "CMS") 100 and a plurality of production bases connected to the CMS 100. The production bases each include information processing apparatuses 101 and 103 and image forming apparatuses 102 and 104. In production base A, the information processing apparatus 101 and the image forming apparatus 102 are connected via a cable, and the information processing apparatus 103 and the image forming apparatus 104 are also connected via a cable. The information processing apparatuses 101 and 103 and the CMS 100 are connected to each other via a network 105. The CMS 100 is a cloud service that is connected to a production base B and a production base C which have a similar configuration to the production base A and the CMS 100 manages the color states of the image forming apparatuses of the plurality of production bases. Note that the production bases illustrated here may be a plurality of production bases of the same printing company or may be production bases of a plurality of printing companies as long as they are of a configuration in which they can be connected to the CMS 100. Further, the information processing apparatuses 101 and 103 play a role of print controllers that manage print jobs of the image forming apparatuses 102 and 104 to which they are respectively connected, and generate raster images, and the like. The print controllers (information processing apparatuses) also execute a process of transmitting a print job (hereinafter, referred to as a color adjustment job) for color adjustment issued by the CMS 100 to the corresponding image forming apparatus 102 or 104, and a process of transmitting device information of the image forming apparatus 102 and 104 to the CMS 100.

In the embodiments described below, a process of printing a color chart and measuring a color patch is referred to as a "color adjustment process". The color adjustment process includes a color inspection process for inspecting a color appearance of a printed matter by the image forming apparatus, a color profile creation process for creating a color profile for color adjustment, and the like. The image forming apparatuses 102 and 104 analyze print data transmitted from the corresponding information processing apparatus, convert the print data into a dot image one page at a time, and then print the dot image. A finisher that performs post processing such as stapling, punching, folding, bookbinding, and cutting on the printed matter can be mounted to the image forming apparatuses 102 and 104, and can output the printed matter while performing various post-processing alongside printing. A scanner for obtaining image data of a printing surface and an optional unit equipped with an inline sensor for obtaining color information of a color chart can also be mounted to the image forming apparatuses 102 and 104.

In the embodiment, an example is given in which two information processing apparatuses and two image forming apparatuses are connected at each production base, but the number and configuration of these apparatuses need not be limited to the configuration of FIG. 1. In addition, a configuration may be adopted in which print data is directly transmitted from the CMS 100 to the image forming apparatus and device information is directly transmitted from the image forming apparatus to the CMS 100 without going through an information processing apparatus having a function as a print controller. The CMS 100 may be of an on-premises type in which it is executed on an information processing apparatus within a print site, instead of as the cloud service.

Figure 2A:
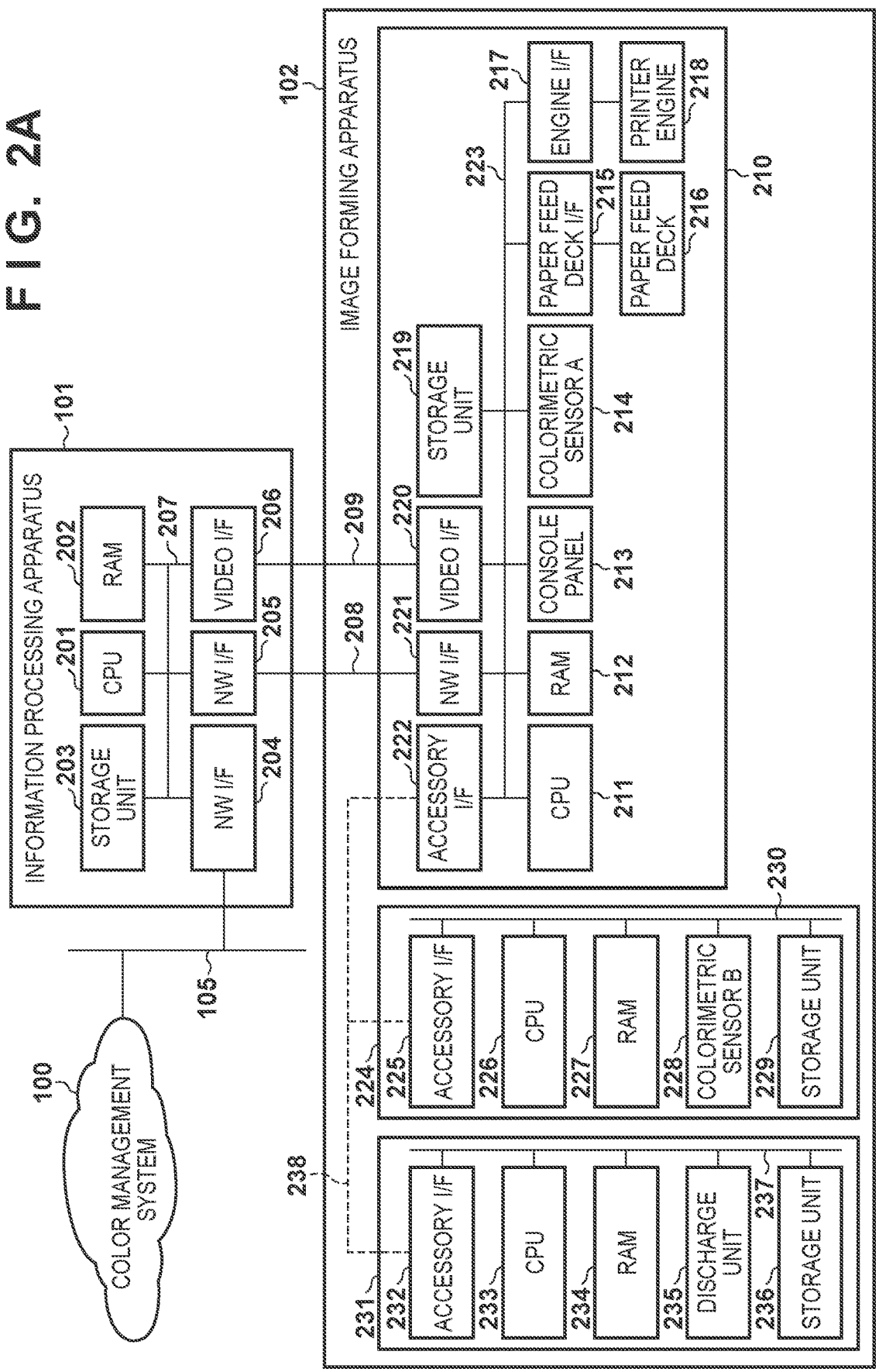
FIG. 2A is a block diagram for describing a hardware configuration of an information processing apparatus and an image forming apparatus according to the first embodiment.

FIG. 2A is a block diagram for describing a hardware configuration of an information processing apparatus 101 and an image forming apparatus 102 according to the first embodiment. Here, since the information processing apparatuses 101 and 103 have the same configuration and the image forming apparatuses 102 and 104 have the same configuration, the information processing apparatus 101 and the image forming apparatus 102 will be described as an example.

First, a configuration of the information processing apparatus 101 will be described.

A CPU 201 executes a program that is stored in a storage unit 203 and deployed into a RAM 202 to thereby handle control and calculations of the respective units of the information processing apparatus 101 via a system bus 207. The RAM 202 is a type of general-purpose volatile storage device that can be directly accessed by the CPU 201, and is used as a work area of the CPU 201 and also as a temporary data storage area. The storage unit 203 functions as a temporary storage area and a work memory when the information processing apparatus 101 operates. A network interface (NW I/F) 204 is connected to the CMS 100 via the network 105, and the information processing apparatus 101 communicates with the CMS 100 via the network OF 204. A network OF 205 is connected to a network OF 221 of a print unit main body 210 of the image forming apparatus 102 via a cable 208, and controls communication between the information processing apparatus 101 and the print unit main body 210. A video OF 206 is connected to a video OF 220 of the print unit main body 210 via a video cable 209, and controls communication of image data between the information processing apparatus 101 and the print unit main body 210.

Next, a configuration of the image forming apparatus 102 will be described.

The image forming apparatus 102 includes the print unit main body 210, an optional sensor unit 224, and a sheet discharge unit 231. A CPU 211 of the print unit main body 210 executes a program that is stored in a storage unit 219 and deployed into a RAM 212 to thereby handle control and calculations of the respective units of the print unit main body 210 via a system bus 223. The RAM 212 is a type of general-purpose volatile storage device that can be directly accessed by the CPU 211, and is used as a work area of the CPU 211 and also as a temporary data storage area. The storage unit 219 functions as a temporary storage area and a work memory when the CPU 211 operates.

A colorimetric sensor A214 is an inline sensor arranged on a sheet conveyance path in the print unit main body 210. The colorimetric sensor A214 is a spectral sensor for colorimetrically measuring a patch on a color chart to obtain color information. A plurality of colorimetric sensors A214 are arranged on the sheet conveyance path (the same number as the number of columns of the patch layout), and the colorimetric sensors A214 measure color patches printed on the paper. Therefore, since the sensors are fixed during the colorimetry process by the colorimetric sensors A214, colorimetry can be performed without lowering the printing speed. On the other hand, since there are individual differences among the plurality of sensors, the colorimetric accuracy is inferior to that of a colorimetric sensor B228 of the sensor unit 224 described later.

An engine OF 217 is responsible for communicating with and controlling a printer engine 218. A paper feed deck OF 215 is responsible for communicating with and controlling a paper feed deck 216. The paper feed deck 216 collectively refers to a plurality of paper feed decks (not shown) as a hardware configuration. A console panel 213 is a user interface that accepts a user's operation and presents various kinds of information to the user. The network I/F 221 is connected to the information processing apparatus 101 via the cable 208, and is responsible for communication between the information processing apparatus 101 and the print unit main body 210. In this example, the interfaces connected to the system buses 223 and 207 are directly connected to each other, but the information processing apparatus 101 and the print unit main body 210 may be connected to each other by, for example, a network, and the form of the connection is not limited. The video OF 220 controls the communication of the image data between the information processing apparatus 101 and the print unit main body 210 via the video cable 209. An accessory OF 222 is connected to an accessory OF 225 of the sensor unit 224 and an accessory OF 232 of the sheet discharge unit 231 via a cable 238. The print unit main body 210 communicates with the sensor unit 224 and the sheet discharge unit 231 via the accessory I/Fs 222, 225, and 232.

Next, the configuration of the sensor unit 224 will be described.

A CPU 226 executes a program that is stored in a storage unit 229 and deployed into a RAM 227 to thereby handle control and calculations of the respective units of the sensor unit 224 via a system bus 230. The RAM 227 is a type of general-purpose volatile storage device that can be directly accessed by the CPU 226, and functions as a work area of the CPU 226 and also as a temporary data storage area. The colorimetric sensor B228 is an inline sensor arranged on a sheet conveyance path of the sensor unit 224, and is a spectral sensor for measuring a color patch on a color chart and acquiring color information. The colorimetric sensor B228 is used with the colorimetric sensor A214 described above for colorimetry of patches on color charts. Note that the sensor type is not limited as long as the objects of the present embodiment can be achieved therewith. The colorimetric sensor B228, unlike the colorimetric sensor A214 described above, is arranged as a single unit on the conveyance path, and the sensor itself is moved in the main scanning direction of the sheet to measure the color patches. Therefore, since there are no individual differences between sensors, the colorimetric accuracy is higher than that of the colorimetric sensor A214 described above, but the speed of colorimetry is inferior.

Next, the configuration of the sheet discharge unit 231 will be described.

A CPU 233 executes a program that is stored in a storage unit 236 and deployed into a RAM 234 to thereby handle control and calculations of the respective units of the sheet discharge unit 231 via a system bus 237. The RAM 234 is a type of temporary volatile storage device that can be directly accessed by the CPU 233, and is used as a work area of the CPU 233 and also as a temporary data storage area. A discharge unit 235 controls an operation for discharging to a main tray and a top tray, and monitors and controls a stacking state of each of the main tray and the top tray.

Figure 2B:
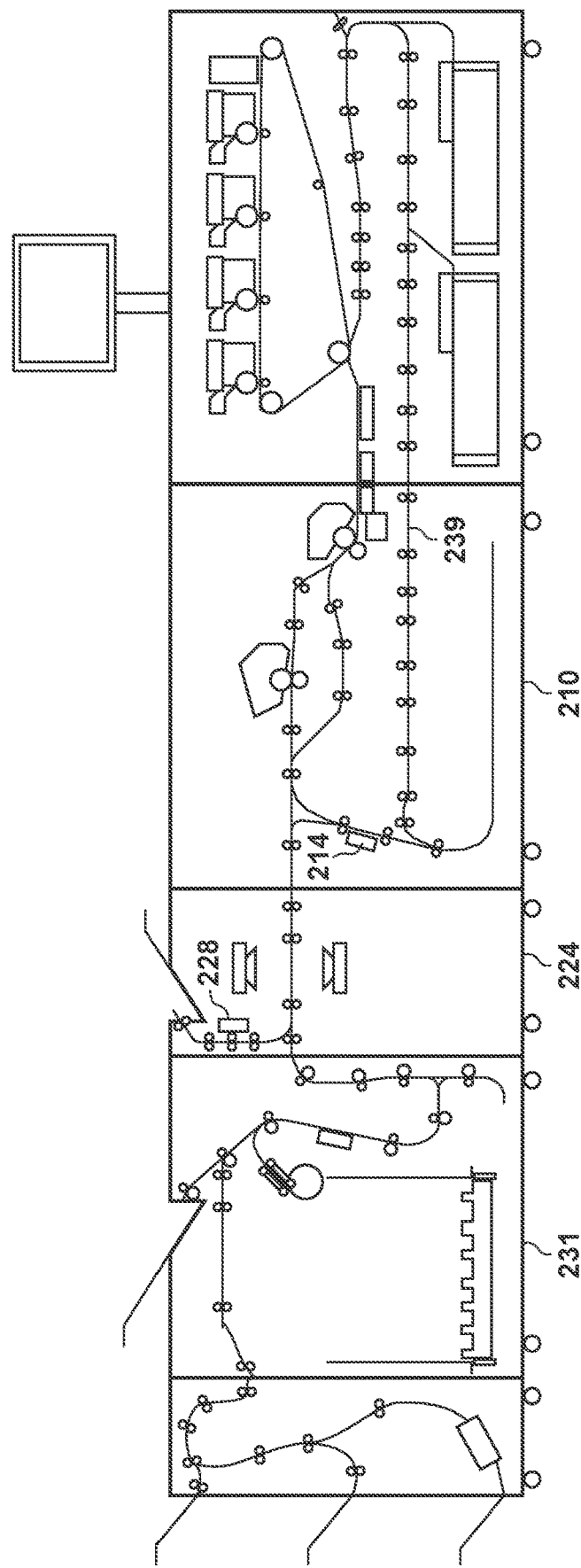
FIG. 2B depicts a schematic cross-sectional view of the image forming apparatus according to the first embodiment.

FIG. 2B depicts a schematic cross-sectional view of the image forming apparatus 102 according to the first embodiment.

The colorimetric sensors A214 are disposed on a sheet conveyance path 239 in the print unit main body 210, and the colorimetric sensor B228 is disposed on the sheet conveyance path of the sensor unit 224. The colorimetric sensors A214 are disposed in the vicinity of a sheet reversing path, and the colorimetric sensors A214 have the limitation that they cannot perform colorimetry in the case of a large (long, etc.) paper size or thick paper. Further, since the colorimetric sensors A214 perform colorimetry while fixed with respect to the sheet conveyance path as described above, in the case of a smaller sheet, there are cases where it is not possible to lay out color patches at positions that the colorimetric sensors A214 can measure. Therefore, there is a limitation on the size of the paper that can be used.

FIG. 3 is a functional block diagram for describing a software configuration of the CMS 100, the information processing apparatus 101, and the image forming apparatus 102 according to the first embodiment. Here, since the information processing apparatuses 101 and 103 have the same software configuration and the image forming apparatuses 102 and 104 have the same software configuration, the information processing apparatus 101 and the image forming apparatus 102 are described as examples. It should be noted that each functional unit illustrated in FIG. 3 is realized by the CPU of the respective device executing a program deployed in the RAM.

First, a software configuration of the CMS 100 will be described.

The CMS 100 includes a device management module 301, a color adjustment processing module 302, a communication module 303, and a web page generation module 304. The CMS 100 is a cloud service that operates using hardware resources such as a server on the cloud, and a processing unit thereof performs processing in response to a request from a client and returns a response to the client. The device management unit 301 sets and manages various kinds of information of the image forming apparatus whose color state is managed. The color adjustment processing module 302 manages a process of generating a color adjustment job for performing color adjustment and transmitting the color adjustment job to the image forming apparatus 102 via the information processing apparatus 101; and a process of analyzing and inspecting color information obtained from the image forming apparatus 102 and managing a color state of the image forming apparatus 102. Further, the color adjustment processing module 302 executes processing of transmitting various requests in response to an operation inputted from the user via a Web page for executing color adjustment processing to be described later. The communication unit 303 manages various types of communication with the information processing apparatus 101 via the network 105. The Web page generation module 304 generates a Web page for executing a color adjustment process to be described later. In addition, a Web page that displays the color state of an image forming apparatus managed by the CMS 100 is also generated. The generated Web page is accessed from Web browsers of the information processing apparatuses (clients) operated by the user. Device information 305 is a database for storing information of the image forming apparatuses managed by the device management unit 301). Sensor and paper correspondence information 306 is a database that stores a correspondence between the colorimetric sensor mounted on the image forming apparatus and the paper information, which is referred to when the color adjustment processing module 302 executes the color adjustment processing. Paper information 314 is a database for storing paper information managed by the CMS 100.

Next, a software configuration of the information processing apparatus 101 will be described.

The information processing apparatus 101 includes a user interface (UI) control module 307, a print job control module 308, and a data transceiver module 309. The UI control module 307 controls an output (for example, image display) to an output device such as a display (not shown), and an input from an input device such as a keyboard (not shown). The print job control module 308 performs control necessary for execution of a print job by the image forming apparatus 102, such as analysis of a print job received via the network 105, raster image development, compression and decompression of image data, and the like. The data transceiver module 309 manages transmission and reception of various types of data to and from the image forming apparatus 102. A print job processed as necessary by the print job control module 308 is transmitted to the image forming apparatus 102 by the data transceiver module 309. Further, the data transceiver module 309 receives information on whether the colorimetric sensor is mounted to the image forming apparatus 102 from the image forming apparatus 102. Furthermore, the data transceiver module 309 also manages the data transmission/reception to/from the CMS 100 connected via the network 105.

Next, a software configuration of the image forming apparatus 102 will be described.

The image forming apparatus 102 includes a UI control module 310, a print processing module 311, a device information management module 312, and a data transceiver module 313. The UI control module 310 controls various types of display and input of various setting information via the console panel 213. The print processing module 311 analyzes data of a print job received from the information processing apparatus 101. The print processing module 311 also controls a series of printing operations for a print job such as paper feeding, paper conveyance, printing, colorimetry by a colorimetric sensor, and paper discharge. The device information management unit 312 manages information of each unit constituting the image forming apparatus 102. Examples of the information include information such as the number of paper feed decks of the print unit main body 210, the names of the paper feed decks, and whether or not the colorimetric sensors A214 are mounted. The device information management unit 312 also manages information such as the attachment status of the optionally mounted sensor unit 224 and whether or not the colorimetric sensor B228 is mounted in the sensor unit 224. The data transceiver module 313 controls data transmission/reception to/from the information processing apparatus 101. The data transceiver module 313 receives the data of a print job from the information processing apparatus 101. For example, when the print job is a color adjustment job for performing color adjustment, the image forming apparatus 102 prints a color chart according to the job, measures the color patches of the color chart with the colorimetric sensors A214 or the like as needed, and transmits the colorimetry result to the information processing apparatus 101. When the print job is a job other than color adjustment job, the data of the print job received from the information processing apparatus 101 is received by the image forming apparatus 102 via the data transceiver module 313. Then, the image forming apparatus 102 executes a print process based on the data of the print job. The processes described in the respective flowcharts described later are executed by the functions of the foregoing software configurations being executed by the CPUs of the respective apparatuses executing a program deployed to the RAM.

Figure 4A:
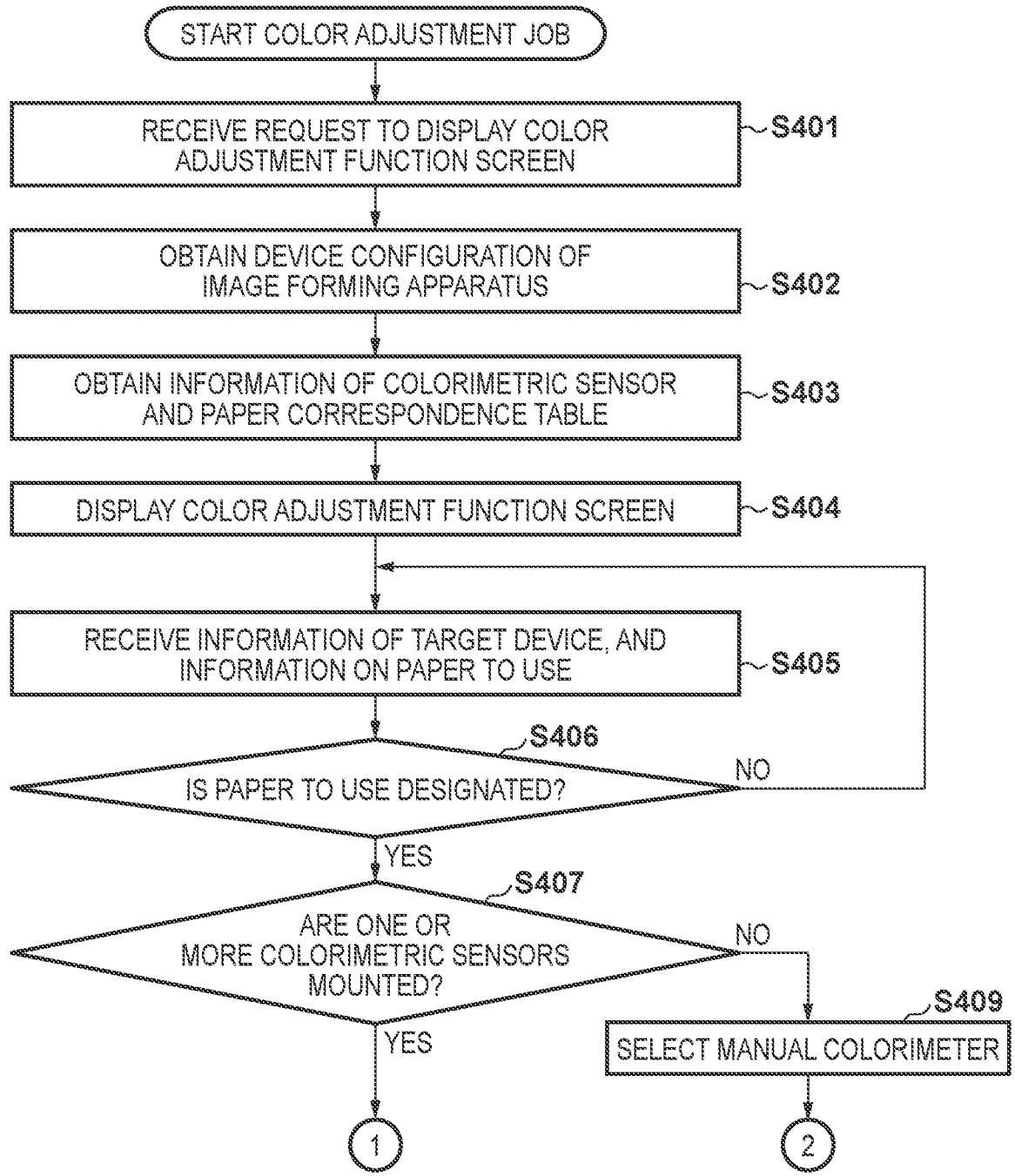
FIGS. 4A and 4B are flowcharts for describing a process for executing a color adjustment job by the color management system according to the first embodiment.
Figure 4B:
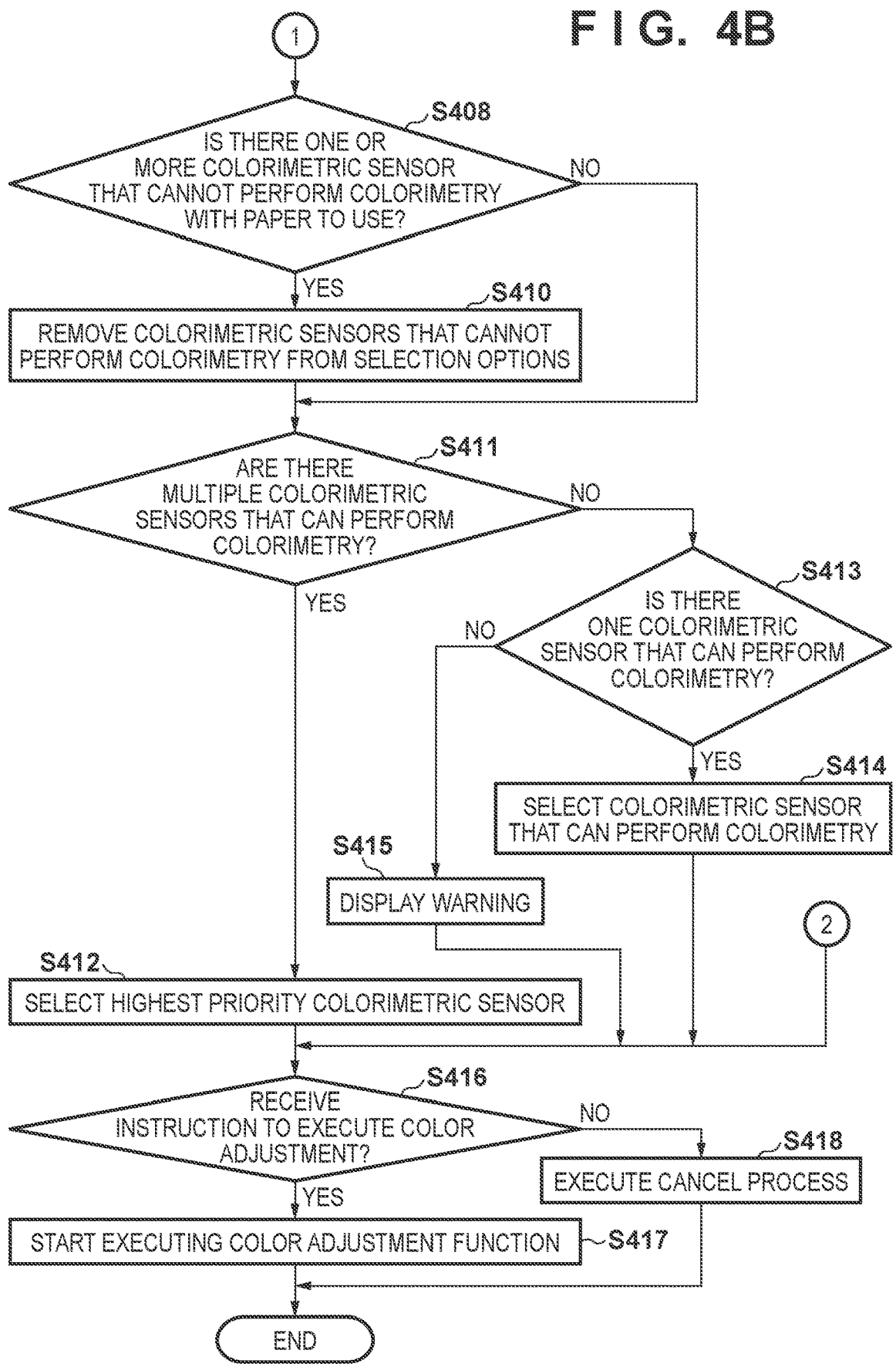

FIGS. 4A and 4B are flowcharts for describing a process for executing a color adjustment job by the color management system according to the first embodiment. Here, the respective processing steps will be described with reference to a color adjustment function screen of FIG. 5A, and the device configuration table, the sensor and paper correspondence information, and the like of FIGS. 7A through 7C. Here, since both the information processing apparatuses 101 and 103, and the image forming apparatuses 102 and 104 can execute processing in a similar manner, in the following description, the information processing apparatus 101 and the image forming apparatus 102 will be described as examples.

First, in step S401, the CMS 100 receives a request for display of the color adjustment function screen from a client operated by a user. Here, for example, a request for display of the color adjustment function screen is transmitted to the CMS 100 when the color adjustment function menu is selected on the client on a Web page of the main screen (not shown) of the CMS 100, and the display request is received via the communication unit 303.

Next, in step S402, the CMS 100 obtains the device configuration of the image forming apparatus 102 to be connected. At this time, the device management unit 301 transmits a request to obtain the device configuration to the image forming apparatus 102 via the communication unit 303. The acquisition request is transmitted via the network 105 to the device information management unit 312 of the image forming apparatus 102 through the data transceiver module 309 of the information processing apparatus 101. The device information management unit 312 returns information of a colorimetric sensor mounted in the image forming apparatus 102. The device management unit 301 stores the returned colorimetric sensor information in the device information 305 in association with the identifier of the image forming apparatus 102.

FIG. 7A is a diagram illustrating an example of a device configuration table stored in device information 305 of the CMS 100. Here, a colorimetric sensor A is mounted in the device Printer-A, and a colorimetric sensor A and a colorimetric sensor B are mounted in the device Printer-B. This is an example where the colorimetric sensor B is not mounted, since the sensor unit 224 is not mounted on the device Printer-A.

Next, the processing advances to step S403, and the CMS 100 obtains sensor/paper information indicating correspondence between the colorimetric sensors and paper. At this time, the color adjustment processing module 302 of the CMS 100 accesses the sensor and paper correspondence information 306 to obtain the sensor and paper correspondence information.

FIGS. 7B to 7C are diagrams illustrating examples of the sensor and paper correspondence information according to the first embodiment.

FIG. 7B illustrates information on paper sizes supported by each colorimetric sensor. For example, the colorimetric sensor A corresponds to the sizes A3, Letter, etc., but does not correspond the sizes A4, B5, etc. On the other hand, the table indicates that the colorimetric sensor B corresponds to the sizes A4 and B5 which the colorimetric sensor A does not correspond to. FIG. 7C is a diagram illustrating paper types/grammages supported by each colorimetric sensor. For example, the table indicates that the colorimetric sensor A corresponds to the grammages 64 to 300 gsm with plain paper, but does not correspond to bond paper. On the other hand, the colorimetric sensor B corresponds to the grammages 52 to 400 gsm with plain paper and the grammages 64 to 105 gsm with bond paper which the colorimetric sensor A does not correspond to. Note that the sensor and paper correspondence information may be dynamically obtained through a connected image forming apparatus, rather than being stored in a database of the CMS 100 in advance. In this way, flexibility is possible, even when the sensor and paper correspondence information differs depending on the type and generation of the image forming apparatus.

Next, the processing proceeds to step S404, and the Web page generation module 304 of the CMS 100 creates a Web page for the color adjustment function screen and returns it to the client. As a result, the received color adjustment function screen is displayed in a Web browser of the client, and the user operates the displayed color adjustment function screen to execute the color adjustment process.

FIG. 5A is a diagram illustrating an example of a color adjustment function screen displayed by the client according to the first embodiment.

Reference numeral 501 denotes a control for a target device by which to designate an image forming apparatus for which color adjustment is to be performed, and reference numeral 502 denotes a control for an adjustment type by which to designate a type of adjustment to be executed. Reference numeral 503 denotes a control for a target profile by which to designate a target profile that needs to be designated depending on the adjustment type to be executed, and reference numeral 504 denotes a control for paper to be used by which to designate the paper to be used in printing of a color chart. Reference numeral 505 denotes a control for colorimetric method by which to designate a colorimetric method for the color chart; specifically, a control for designating a colorimetric sensor. An OK button 506 sets the settings on the screen to enabled and instructs that the color adjustment job start executing. A cancel button 507 cancels all of the settings on the screen and cancels the color adjustment processing.

The processing next proceeds to step S405 and the CMS 100 receives, from the client, the target device for which the adjustment is to be performed, the adjustment type, the target profile, and the designation of the paper to be used, which are inputted on the color adjustment function screen. It is assumed that the paper listed in the paper to be used is acquired from a paper list managed by the CMS 100 in advance and displayed. Attributes of size, type, and grammage are assigned to the paper. The color adjustment processing module 302 of the CMS 100 receives the content inputted on the color adjustment function screen from the client via the communication unit 303.

In step S406, the color adjustment processing module 302 determines whether the received request includes designation of "paper to use" in the control 504. If the request includes the designation of "paper to use", the processing proceeds to step S407, otherwise the processing proceeds to step S405. In step S407, the device management unit 301 of the CMS 100 determines whether or not there is one or more colorimetric sensors mounted in the image forming apparatus of the target device. At this time, the device management unit 301 accesses the device information 305 and determines whether or not there are one or more colorimetric sensors mounted in the image forming apparatus designated by the target device of the control 501. If it is determined that there are one or more sensors, the processing proceeds to step S408, and if it is determined that there is no sensor, the processing proceeds to step S409. In step S409, the color adjustment processing module 302 sets a manual colorimeter as the colorimetric method of the control 505, and the processing proceeds to step S416. When the target device is not equipped with a colorimetric sensor that automatically performs colorimetry, the manual colorimeter is selected. For example, in the device configuration table (FIG. 7A) of the device information 305, if "Printer-B" is designated as the target device, it is determined that one or more of the colorimetric sensor A and the colorimetric sensor B are mounted in the device "Printer-B".

In step S408, the color adjustment processing module 302 of the CMS 100 determines whether or not there are one or more colorimetric sensors in the image forming apparatus that are not capable of performing colorimetry on the paper designated by the "paper to use" of the control 504. If it is determined that there is no colorimetric sensor that cannot perform the colorimetry, the processing proceeds to step S411, and if it is determined that there are one or more colorimetric sensors that cannot perform the colorimetry, the processing proceeds to step S410. At this time, the color adjustment processing module 302 accesses the sensor and paper correspondence information 306 and determines whether or not paper that is designated in the "paper to use" of the control 504 for the colorimetric sensors mounted in the image forming apparatus designated by the target device of the control 501 can be used.

For example, in the device configuration table of FIG. 7A, the device (Printer-B) is equipped with a colorimetric sensor A and a colorimetric sensor B. In the sheet size relation table in FIG. 7B, the colorimetric sensor A does not correspond to the designated "A4: plain paper 80 gsm" which is designated as the "paper to use" in the control 504, and the colorimetric sensor B does correspond to "A4: plain paper 80 gsm". Therefore, it is determined in step S408 that there are one or more colorimetric sensors that cannot perform the colorimetry in this case.

In step S410, the color adjustment processing module 302 performs control so that the colorimetric sensors determined not to be able to perform the colorimetry in step S408 cannot be selected in the colorimetric method of the control 505.

FIG. 5B illustrates an example where control is performed so that a colorimetric sensor determined to not be able to perform the colorimetry cannot be selected in the colorimetric method of the control 505. In a display field 508, the character string "unusable" is added to the end of the sensor name "colorimetric sensor A" to indicate that the colorimetric sensor A is excluded from the selection options. Furthermore, the system also controls so that the colorimetric sensor A which is "unusable" cannot be selected.

Then, the processing proceeds to step S411, and the color adjustment processing module 302 determines whether or not there are a plurality of colorimetric sensors that can perform the colorimetry on the paper designated in the "paper to use". If there are a plurality of colorimetric sensors that can perform the colorimetry, the processing proceeds to step S412, and if there are not a plurality of such colorimetric sensors, the processing proceeds to step S413. For example, Printer-B of the device configuration table in FIG. 7A is equipped with the colorimetric sensor A and the colorimetric sensor B; in a case where there is no colorimetric sensor that cannot perform the colorimetry in the above-described step S408 process, it is determined that there are a plurality of colorimetric sensors that can perform the colorimetry. Alternatively, if three or more colorimetric sensors are mounted in the image forming apparatus, it means that there are a plurality of colorimetric sensors that can perform the colorimetry, even if there is one colorimetric sensor determined to not be able to perform the colorimetry in step S408.

In step S412, the color adjustment processing module 302 designates a colorimetric sensor having the highest priority among the plurality of colorimetric sensors that can perform the colorimetry, as the colorimetric method in the control 505, and the processing proceeds to step S416. A priority that is defined in advance in the CMS 100 is used. For example, in a case where both of the colorimetric sensor A and the colorimetric sensor B can perform the colorimetry, the higher priority colorimetric sensor B is selected.

In step S413, the color adjustment processing module 302 determines whether or not one colorimetric sensor can perform the colorimetry. In the case where there is one colorimetric sensor that can perform the colorimetry, the processing proceeds to step S414, and if there is not one colorimetric sensor that can perform the colorimetry, the processing proceeds to step S415. In a case where the colorimetric sensor A cannot be selected according to the "paper to use" of the control 504 in the previously described device, illustrated in FIG. 5B, in which the colorimetric sensor A and the colorimetric sensor B are mounted, only the colorimetric sensor B can perform the colorimetry, and therefore, it is determined that there is one colorimetric sensor that can perform the colorimetry. In step S414, the color adjustment processing module 302 designates the colorimetric sensor that can perform the colorimetry as the colorimetric method of the control 505, and proceeds to step S416. In addition, in step S415, the color adjustment processing module 302 displays a warning indicating that there is no colorimetric sensor that can perform the colorimetry using the paper designated as the "paper to use" in the control 504, and the processing proceeds to step S416.

FIG. 7E is a diagram illustrating an example of the warning screen displayed in step S415. Here, it is presented to the user that there is no colorimetric sensor that can perform the colorimetry using the paper designated in "paper to use".

In step S416, the color adjustment processing module 302 determines whether a request received via the communication unit 303 is a press of the OK button 506. In a case where the OK button 506 has been pressed, it is determined to be an instruction to start executing a color adjustment job, and the processing proceeds to step S417, and when the cancel button 507 is pressed, the processing proceeds to step S418. In step S418, the color adjustment processing module 302 cancels the execution of the color adjustment function, and ends this processing. In step S417, the color adjustment processing module 302 executes a color adjustment job. At this time, the color adjustment processing module 302 generates a color adjustment job based on various setting values designated on the color adjustment function screen, and transmits the color adjustment job to the target image forming apparatus. In addition, the color adjustment processing module 302 generates page information of the color chart with PDF data or the like, creates a job ticket serving as a print setting instruction of the image forming apparatus, and transmits the job ticket to the data transceiver module 309 of the information processing apparatus via the communication unit 303 and the network 105. The print job control module 308 of the information processing apparatus 101 analyzes the print job received by the data transceiver module 309, develops the page information of the color chart into a raster image, converts the print settings instructed by the job ticket into a command for the image forming apparatus, and transmits the command to the data transceiver module 313 of the image forming apparatus. Thus, the print processing module 311 analyzes the raster image and the command received by the data transceiver module 313, and the image forming apparatus performs printing of a color chart page and a colorimetry process using a designated colorimetric sensor.

Figure 8:
FIG. 8 is a diagram illustrating an example of a job ticket generated by a color adjustment processing module according to the first embodiment.

FIG. 8 is a diagram illustrating an example of a job ticket generated by the color adjustment processing module 302 according to the first embodiment.

In the figures, reference numeral 801 denotes information on the paper to be used. In FIG. 8, A3 size, 80 gsm, plain paper is designated. Reference numeral 802 denotes information on a colorimetric sensor to be used. In the information 802 of the colorimetric sensor to be used, a colorimetric sensor B (ColorMeasurement Sensor B) is designated as a colorimetric sensor (MeasurementMethod) to be used. On the basis of the job ticket, the image forming apparatus 102, after receiving the print instruction, performs control to perform the colorimetry process by using the colorimetric sensor B228 of the sensor unit 224.

As described above, according to the first embodiment, it is possible to automatically select an available colorimetric sensor according to the paper used in the color adjustment function. Therefore, the user is enabled to select a colorimetric sensor that can perform the colorimetry on the designated sheet without needing to be aware of sheet restrictions for each colorimetric sensor.

Second Embodiment

A second embodiment of the present invention will be described. Note that description of configurations that are identical to those of the above-described first embodiment is omitted. The second embodiment describes a color adjustment process to which a process of acquiring the state of the colorimetric sensors is added.

Figure 10A:
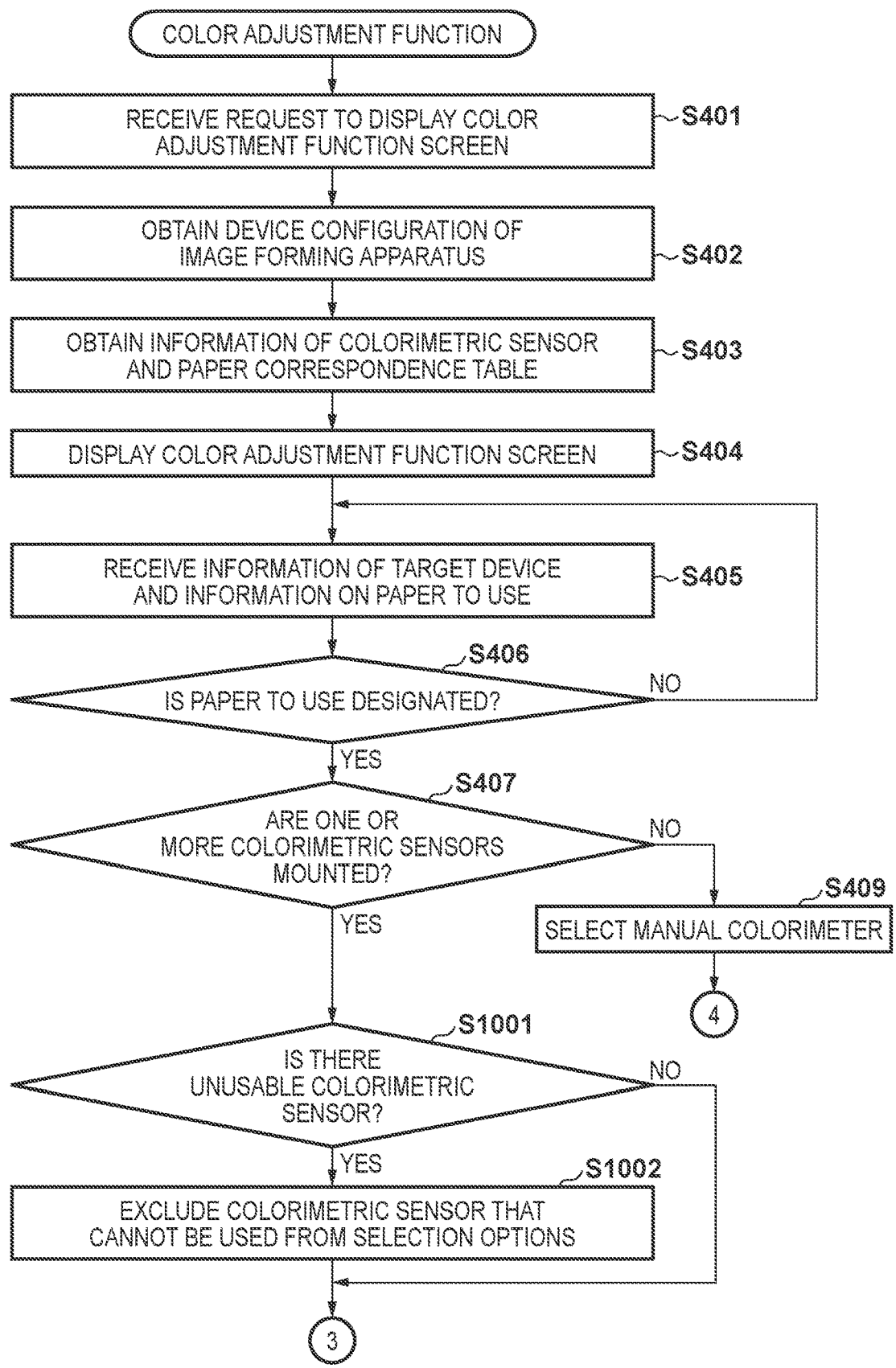
FIGS. 10A and 10B are flowcharts for describing a process for executing a color adjustment job by the color management system according to a second embodiment.
Figure 10B:
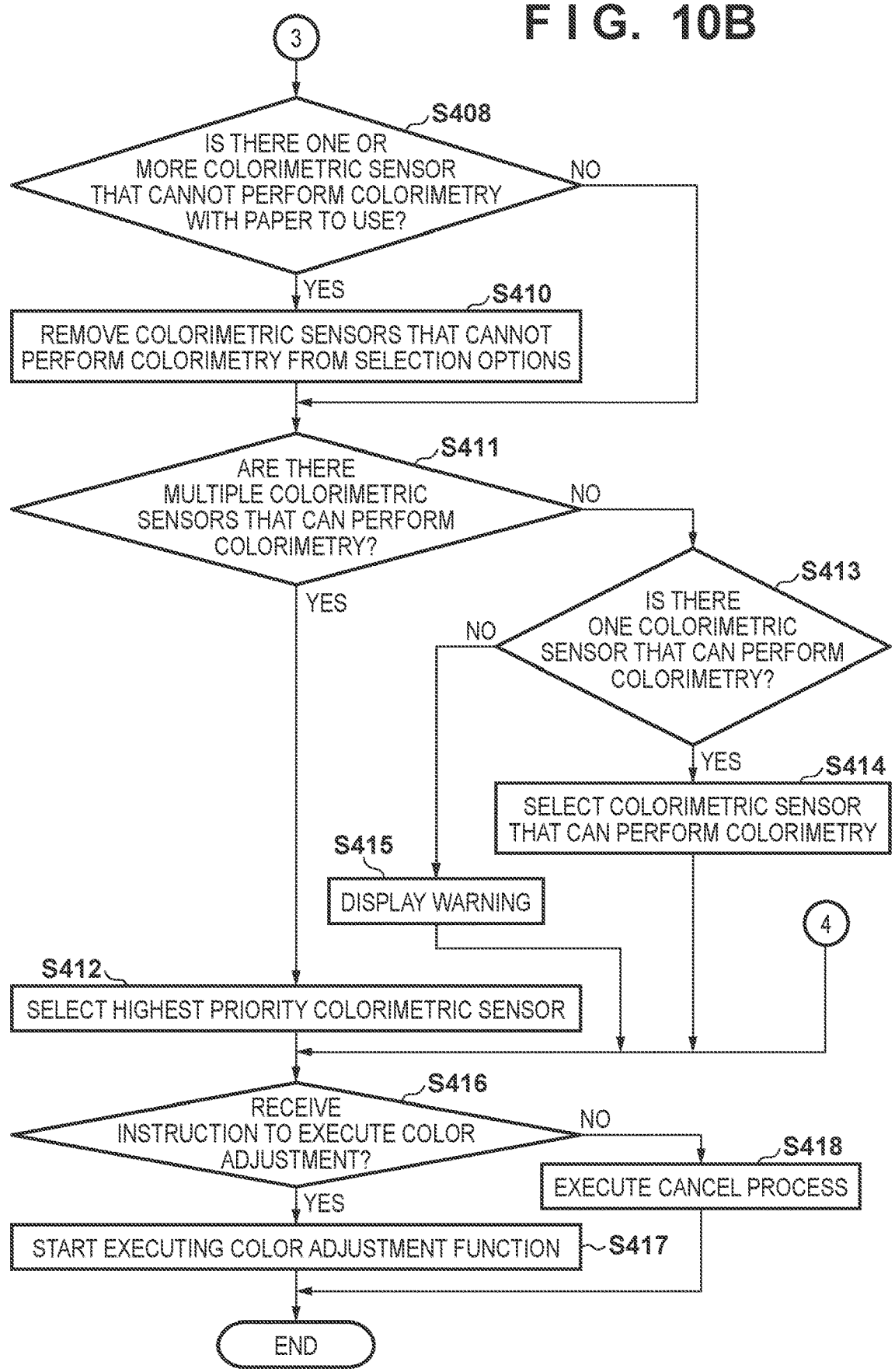

FIGS. 10A and 10B are flowcharts for describing a process for executing a color adjustment job by the color management system according to the second embodiment. In FIGS. 10A and 10B, the same reference numerals are used for processing that is identical to that of above-described FIGS. 4A and 4B and description thereof is omitted.

In step S1001, the device management unit 301 of the CMS 100 determines whether or not there is a colorimetric sensor that is in an unusable state in the image forming apparatus 102 based on the information of the colorimetric sensor returned from the device information management unit 312 of the image forming apparatus 102. If there is a colorimetric sensor that is in an unusable state, the processing proceeds to step S1002, and the color adjustment processing module 302 excludes the colorimetric sensors in the unusable state from the selection options, and the processing proceeds to step S408. If there is no colorimetric sensor that is in an unusable state, the processing proceeds to step S408.

The processing of step S1001 will be described in detail. The device management unit 301 transmits, via the network 105 and the data transceiver module 309 of the information processing apparatus 101, a request for checking the state of the colorimetric sensor to the image forming apparatus 102 to be subjected to color adjustment. At this time, the data transceiver module 309 of the information processing apparatus 101 transmits the request received from the CMS 100 to the data transceiver module 313 of the image forming apparatus 102. The data transceiver module 313 obtains a state of the colorimetric sensor from the device information management unit 312 based on the received request. Then, the device information management unit 312 determines whether there is a colorimetric sensor in which an error has occurred, and if so, returns the information of the colorimetric sensor in which the error has occurred from the data transceiver module 313 to the device management unit 301 of the CMS 100 via the information processing apparatus 101. The colorimetric sensor in which an error has occurred is determined in this way to be in an unusable state in the color adjustment processing.

As described above, by virtue of the second embodiment, when there is a colorimetric sensor that is in an unusable state in the image forming apparatus, it is possible to perform control so that the colorimetric sensor cannot be used in the color adjustment function. This can prevent the user from erroneously generating a color adjustment job that designates a colorimetric sensor in an unusable state.

Third Embodiment

Next, a third embodiment of the present invention will be described. Note that the same components as those of the first and second embodiments described above are denoted by the same reference numerals, and description thereof will be omitted. In the third embodiment, the process of changing the priority of the colorimetric sensor to be used according to a parameter designated when the color adjustment function is executed will be described.

Figure 11A:
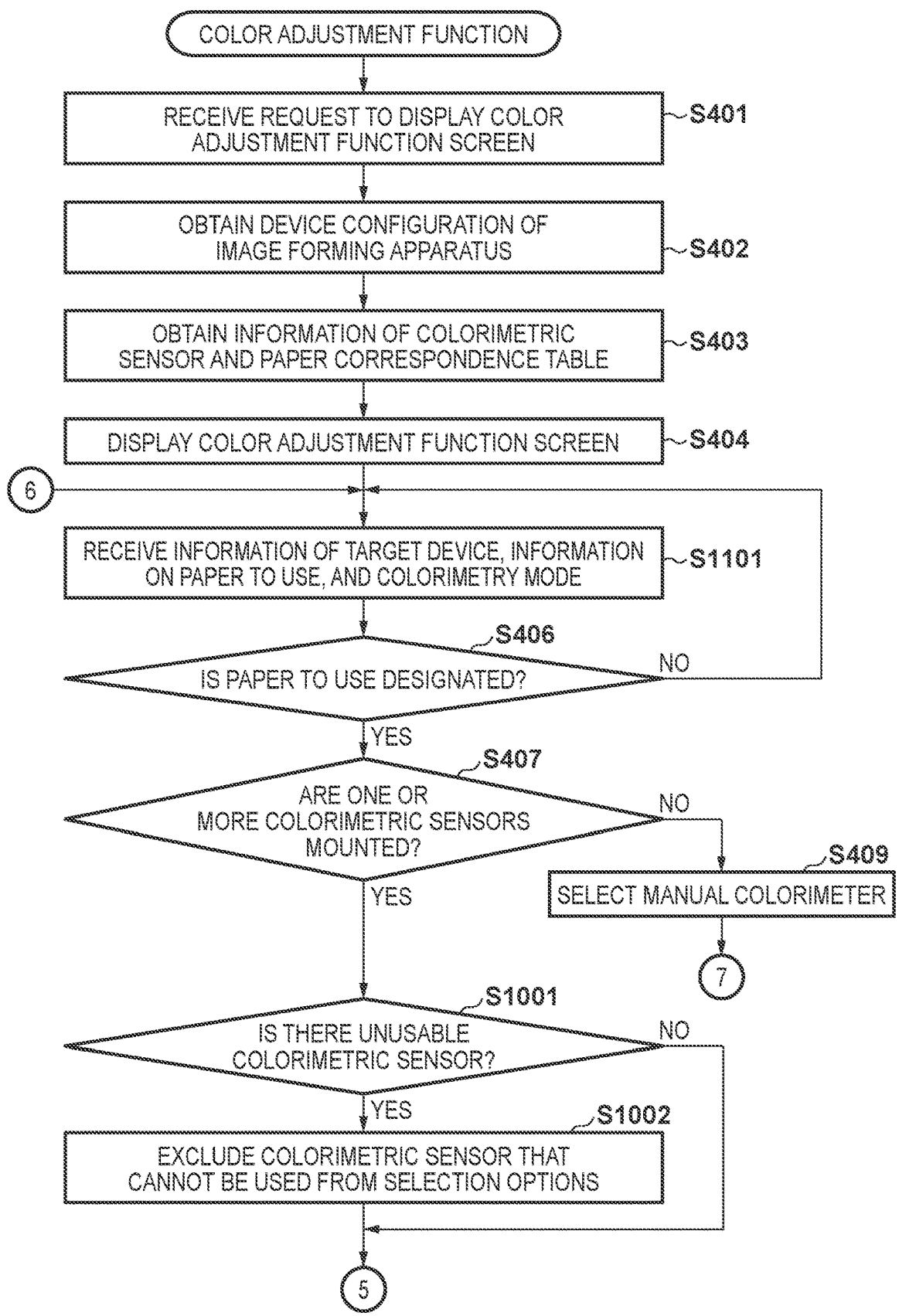
FIGS. 11A and 11B are flowcharts for describing a process for executing a color adjustment job by the color management system according to a third embodiment.
Figure 11B:
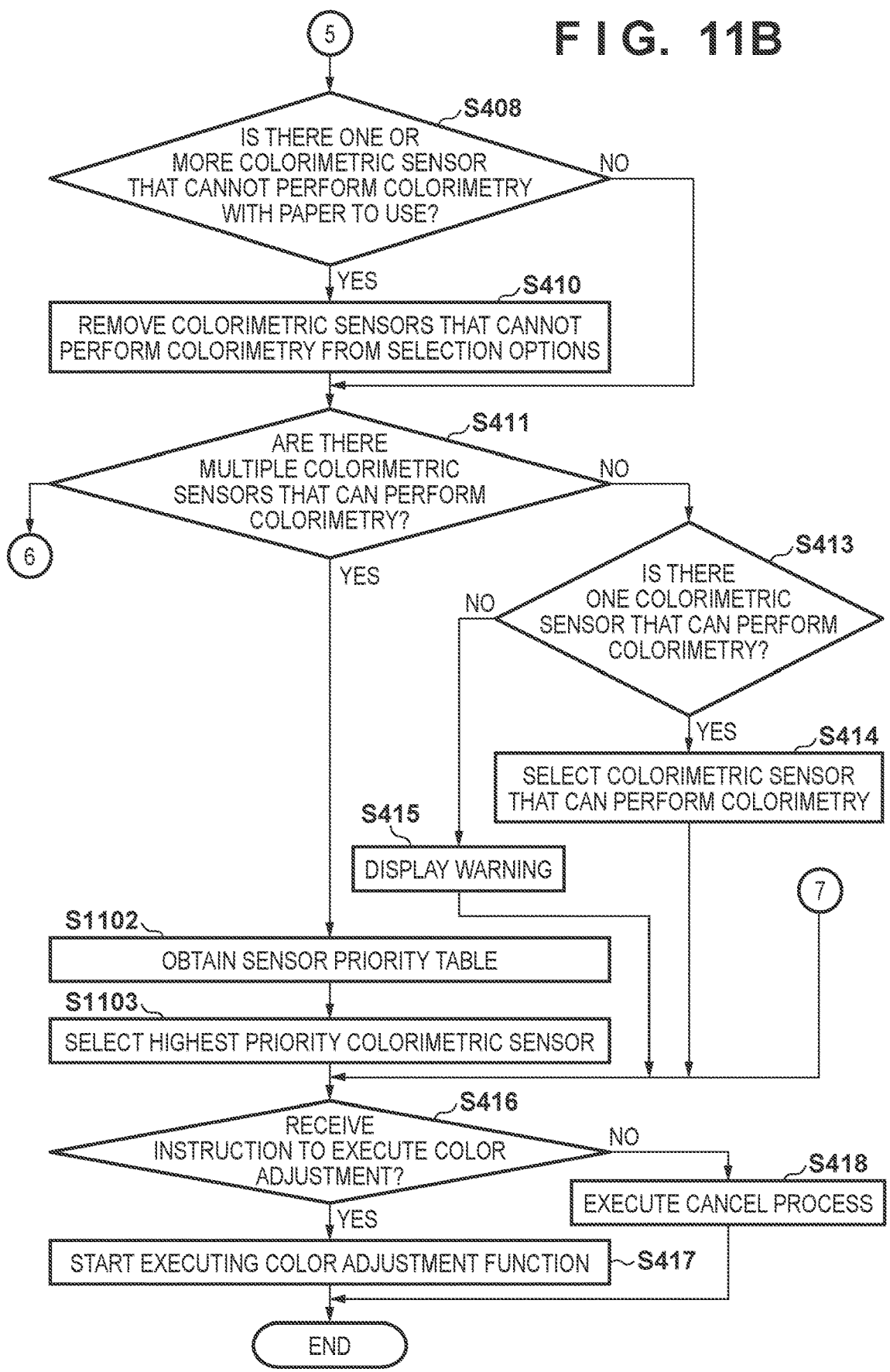

FIGS. 11A and 11B are flowcharts for describing a process for executing a color adjustment job by the color management system according to the third embodiment. Here, the same reference numerals are used for processing that is identical to that of FIGS. 4A and 4B and FIGS. 10A and 10B, and the description thereof will be omitted.

In step S1101, the designation item "colorimetry mode" is received in addition to "target device" and "paper to use" in the color adjustment function screen of FIG. 12A.

FIG. 12A is a diagram illustrating an example of a color adjustment function screen displayed by a client according to the third embodiment. The components that are the same as those in FIG. 5A of the above-described first embodiment are denoted by the same reference numerals, and the explanation thereof will be omitted.

In FIG. 12A, a control 1201 for "colorimetry mode" is added. In the control 1201 for the colorimetry mode, an operation mode when the colorimetric sensor of the image forming apparatus 102 measures a color chart can be designated. In the third embodiment, it is assumed that either "standard" or "speed priority" can be selected. In the example of FIG. 12A, "speed priority" is designated. A request transmitted from the client in response to designation of each control on this screen is received by the color adjustment processing module 302 via the communication unit 303.

Then, in step S411, the processing proceeds to step S1102 when it is determined by the color adjustment processing module 302 that there are a plurality of colorimetric sensors that can perform the colorimetry. In step S1102, the color adjustment processing module 302 obtains a sensor priority table.

FIG. 12B is a diagram illustrating an example of a sensor priority table according to the third embodiment.

In the sensor priority table, the priority of the colorimetric sensor corresponding to the colorimetry mode (the numerical value "1" is the highest priority) is defined. In the standard mode, the colorimetric sensor B has priority 1 and the colorimetric sensor A has priority 2. In speed priority mode, the colorimetric sensor A has priority 1 and the colorimetric sensor B has priority 2. As described above, since a plurality of colorimetric sensors A are arranged in a sheet conveyance path in the image forming apparatus 102 and colorimetry is performed in a state where the sensors are fixed, colorimetry can be performed without lowering the printing speed, and therefore that the speed of colorimetry is high but the colorimetric accuracy suffers. On the other hand, although the colorimetric sensor B has high colorimetric accuracy, the speed of colorimetry suffers therewith.

Standard mode is defined such that colorimetric accuracy is prioritized and the colorimetric sensor B is used preferentially, and speed priority mode is defined such that the speed of colorimetry is prioritized and the colorimetric sensor A is used preferentially.

The processing proceeds to step S1103, and the color adjustment processing module 302 designates the colorimetric sensor to be used in the color adjustment in the control 505 in accordance with the priorities of the colorimetric sensors obtained in step S1102. Here, for example, when the "speed priority mode" is instructed in step S1101, the colorimetric sensor A is preferentially selected in the control 505 of the colorimetric method.

As described above, by virtue of the third embodiment, it is possible select a colorimetric sensor according to the priorities of colorimetric sensors which accord to the colorimetry mode when automatically selecting an available colorimetric sensor according to the paper to be used in the color adjustment function. Note that in the third embodiment an example has been given in which a colorimetric sensor having a priority corresponding to the "speed priority" colorimetry mode is selected, but there is no limitation to this colorimetry mode, and a colorimetric sensor may be selected by defining priorities of colorimetric sensors corresponding to a designated mode, parameters, or the like.

Fourth Embodiment

A fourth embodiment of the present invention will be described. Note that description of configurations that are identical to those of the above-described first to third embodiments is omitted. In the fourth embodiment, a description will be given of a process of limiting a paper that is designated when the color adjustment function is executed to a paper stored in the paper feed source of the target image forming apparatus.

Figure 13A:
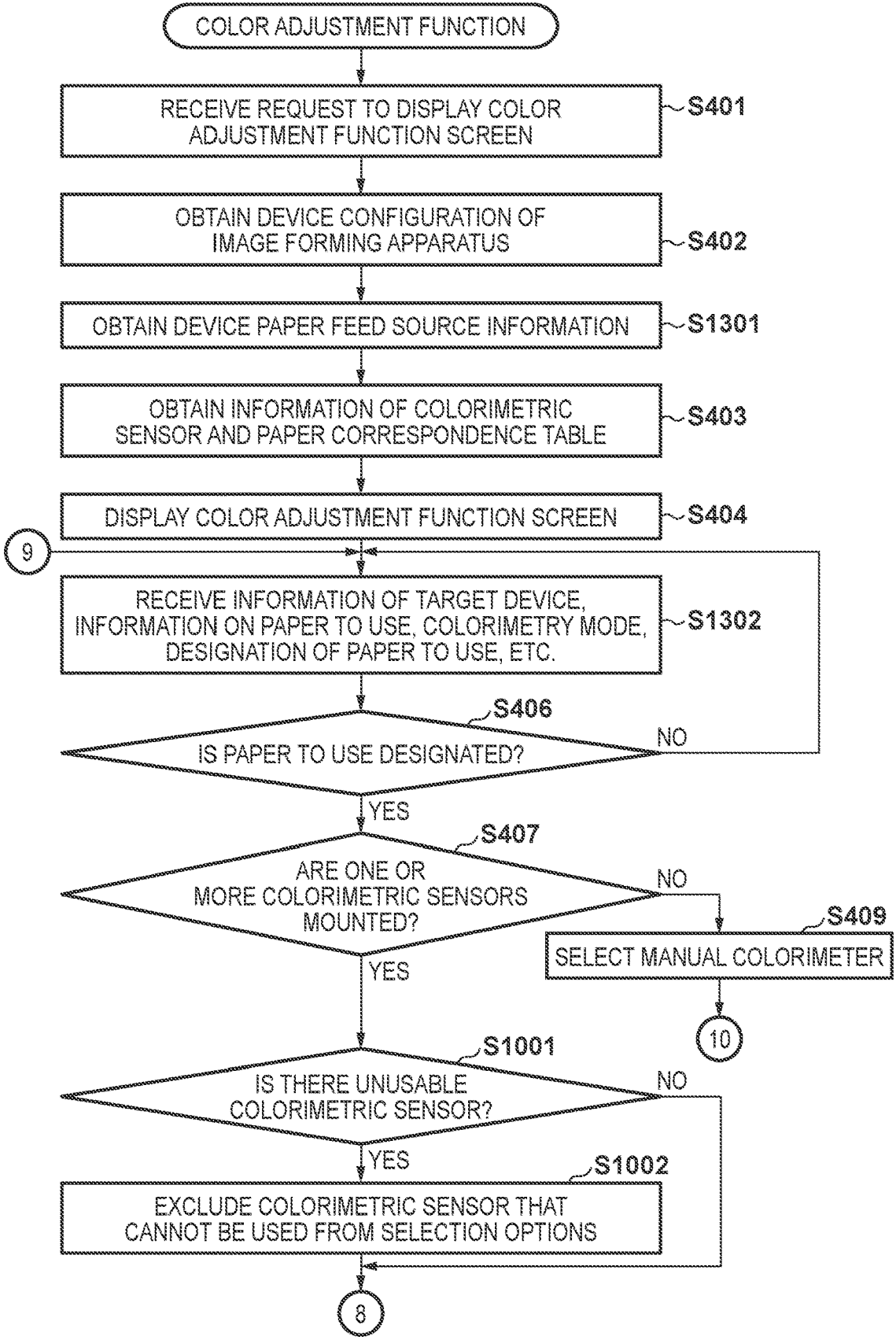
FIGS. 13A and 13B are flowcharts for describing a process for executing a color adjustment job by the color management system according to a fourth embodiment.
Figure 13B:
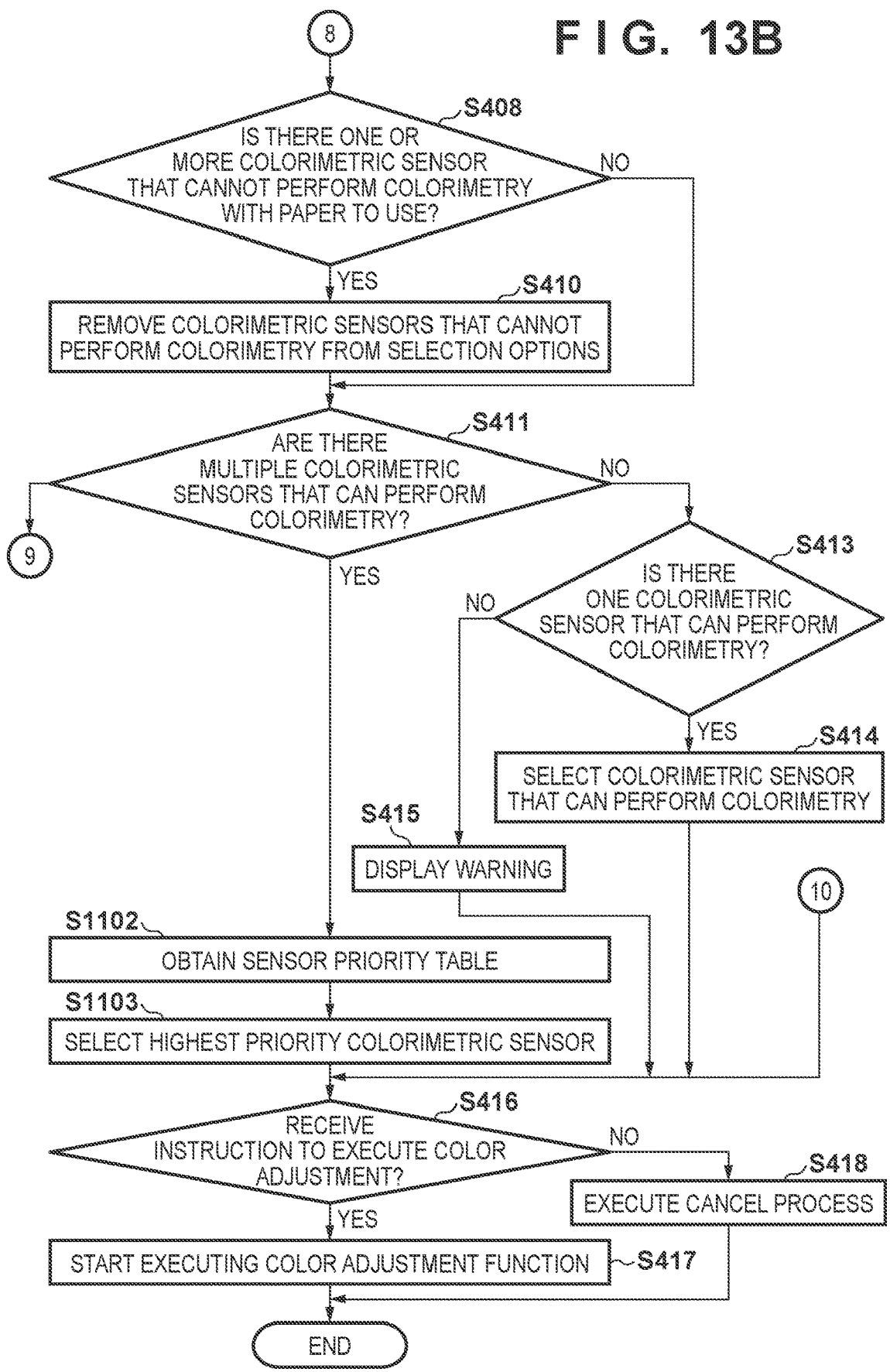

FIGS. 13A and 13B are flowcharts for describing a process for executing a color adjustment job by the color management system according to the fourth embodiment. Here, the same reference numerals are used for processing that is identical to that of FIGS. 4A and 4B, FIGS. 10A and 10B, and FIGS. 11A and 11B, and the description thereof will be omitted.

In step S1301, the device management unit 301 of the CMS 100 obtains paper feed source information of the image forming apparatus 102. At this time, the device management unit 301 transmits a request to obtain the paper feed source information of the image forming apparatus 102 from the communication unit 303 to the data transceiver module 309 of the information processing apparatus 101 through the network 105. As a result, the data transceiver module 309 of the information processing apparatus 101 analyzes the received request and transmits a command for requesting the paper feed source information to the device information management unit 312 of the image forming apparatus 102. Accordingly, the device information management unit 312 returns the paper feed source information to the information processing apparatus 101 in response to the received command. The device management unit 301 of the CMS 100 receives the paper feed source information returned from the device information management unit 312 of the image forming apparatus 102, and adds the paper feed source information to the device information table of the device information 305.

FIG. 14A is a diagram illustrating an example in which paper feed source information is added to a device configuration table of FIG. 7A. In FIG. 14A, in the cassette 1 of Printer-A, A4, plain paper, 80 gsm is set, and in the cassette 2, A4, coated paper, 80 gsm is set. Also, in the cassette 1 of Printer-B, A4, plain paper, 80 gsm is set, and in the cassette 2, A3, coated paper, 80 gsm is set.

In step S1302, the device management unit 301 receives, for example, the designation of the control 501 for the device for which to perform the adjustment; the control 502 for the adjustment type; the control 1201 for the colorimetry mode; the control 503 for the target profile; and a control 1401 for the paper to use, which are inputted on a color adjustment function screen of FIG. 14B.

FIG. 14B is a diagram illustrating an example of a color adjustment function screen displayed by a client according to the fourth embodiment.

The color adjustment processing module 302 refers to the device information table obtained in step S1301 in response to the designation of the control 501 for the target device, obtains the paper feed source of the designated image forming apparatus and information on the paper stored in the paper feed source, and displays the paper information in a list as the selection options for the control 1401 for the paper to use.

In the color adjustment function screen in FIG. 14B, in addition to the paper information, information on the paper feed source in which paper is stored is also displayed in the control 1401 for the paper to use.

FIG. 14C illustrates a state in which the list of the control 1401 for paper to use is opened. Reference numeral 1402 denotes that A3, coated paper, 80 gsm is stored in the paper feed source "cassette 2". As described above, the paper feed sources of the image forming apparatus 102 in which paper is currently stored in the paper feed source are displayed in the paper information. For a sheet that is not stored in a paper feed source, [x] is displayed in the paper information as indicated by reference numeral 1403, for example. At this time, the color adjustment processing module 302 performs control such that paper that is not stored in a paper feed source cannot be selected on the control 1401 for the paper to be used. Displaying [x] in the paper information for paper that is not stored in the paper feed source is only one example, and another representation such as changing the color of the character string may be used as long as it indicates that the paper is not stored in a paper feed source.

As described above, by virtue of the fourth embodiment, it is possible to select a paper to be used in the color adjustment function from among the paper that is stored in the paper feed sources of the target image forming apparatus. In addition, an available colorimetric sensor is automatically selected according to the designated sheet. Accordingly, it is possible to designate a paper that is stored in a paper feed source and to select a colorimetric sensor without error. In the fourth embodiment, an example has been described in which a paper that is not stored in a paper feed source is made to be unselectable, but configuration may be such that selection is made possible, but if the designated paper is not stored in a paper feed source when the paper feed source is selected, a warning for requesting to store the designated paper in the selected paper feed source is issued.

Fifth Embodiment

A fifth embodiment of the present invention will be described. Note that the same components as those of the embodiments described above are denoted by the same reference numerals, and description thereof will be omitted.

Figure 15A:
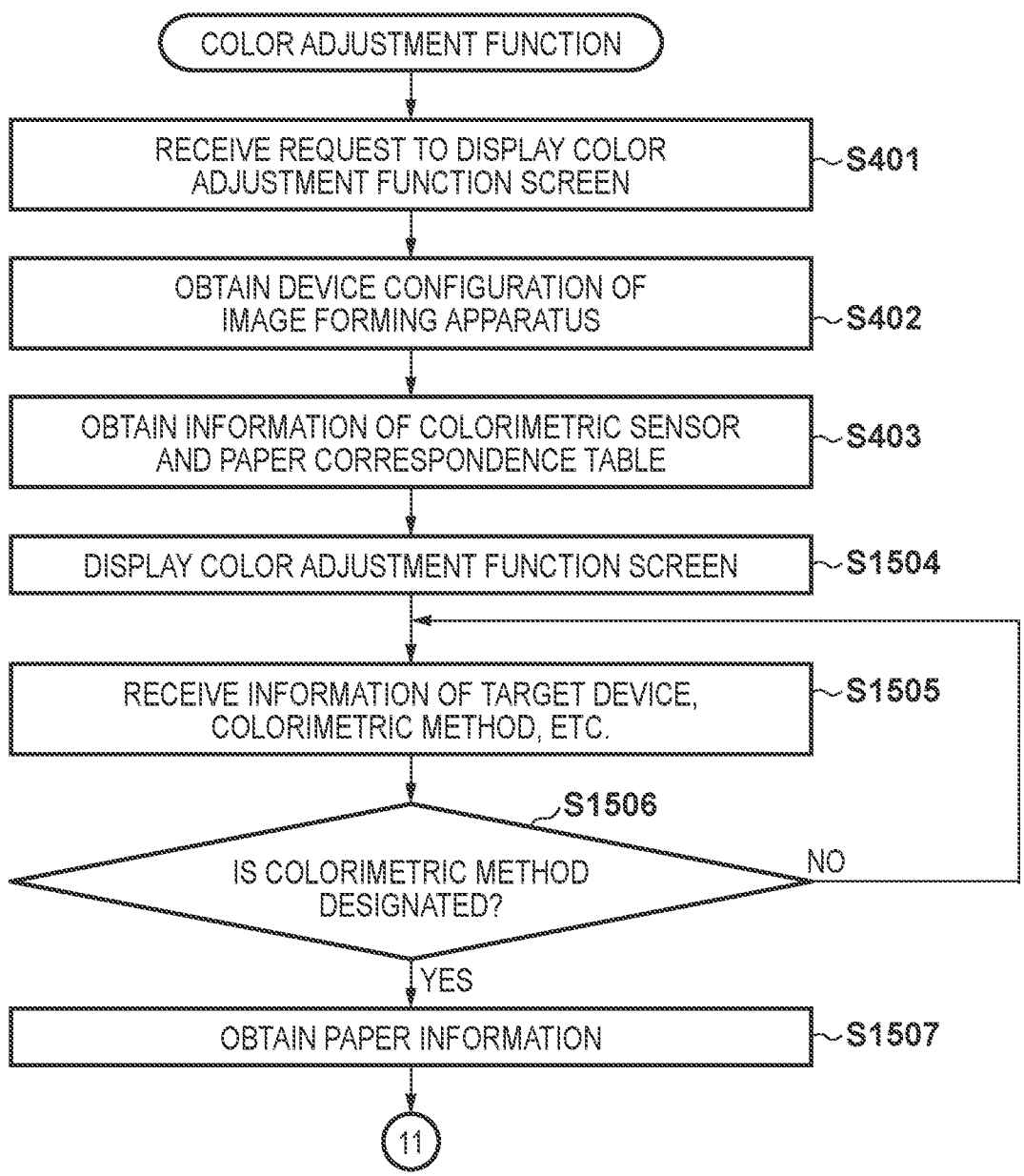
FIGS. 15A and 15B are flowcharts for describing a process for executing a color adjustment job by the color management system according to the fifth embodiment.
Figure 15B:
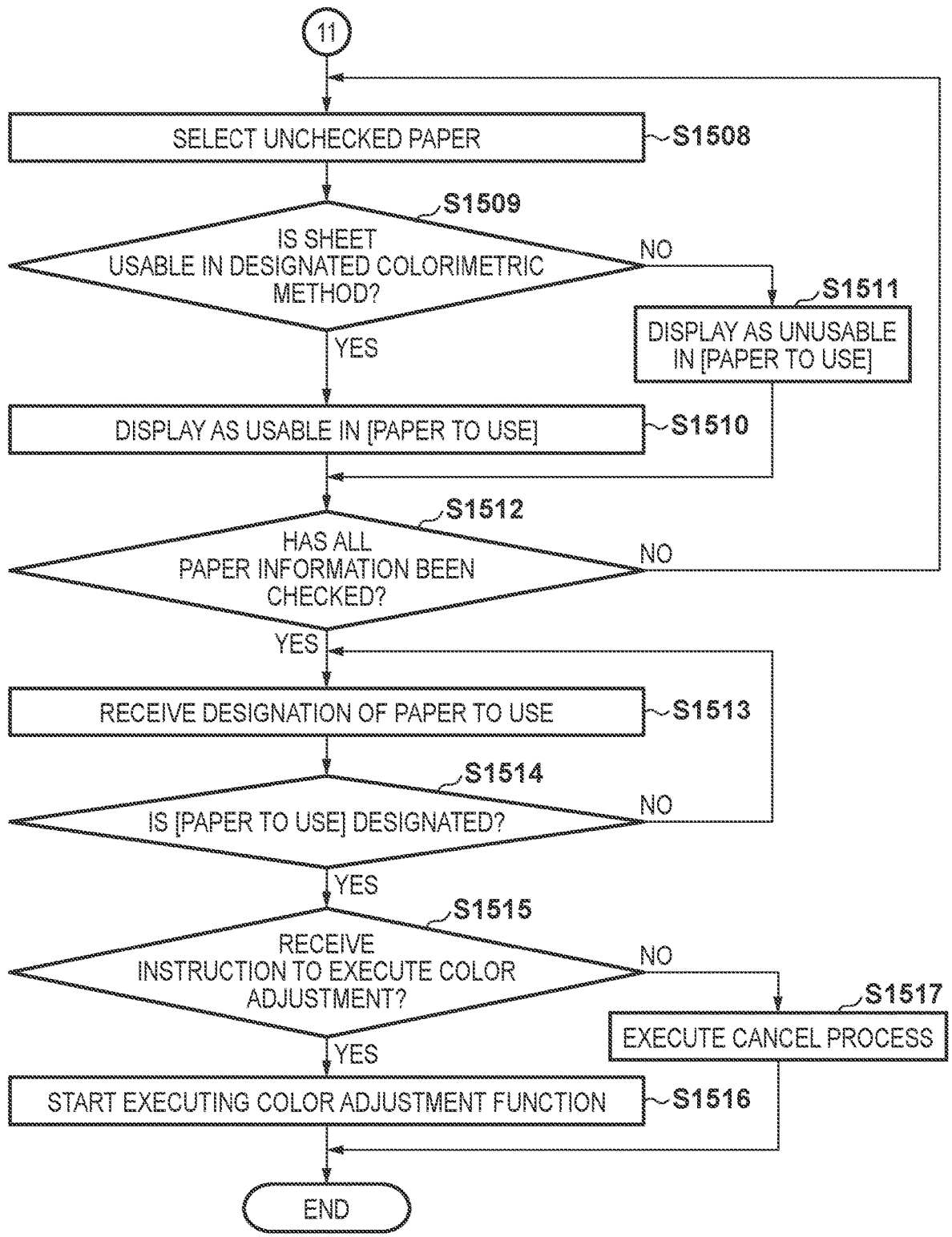

FIGS. 15A and 15B are flowcharts for describing a process for executing a color adjustment job by the color management system according to the fifth embodiment. Here, the respective processing steps will be described with reference to the color adjustment function screen of FIG. 5A, the device information table of FIG. 7A, the sensor and paper correspondence information of FIG. 7B and FIG. 7C, and the paper information of FIG. 17A. Here, the same reference numerals are used for processing that is identical to that of above-described FIGS. 4A and 4B, and the description thereof will be omitted.

In step S1504, the Web page generation module 304 of the CMS 100 creates a Web page for the color adjustment function screen and returns it to the client. As a result, the received color adjustment function screen is displayed in a Web browser of the client, and the user operates the displayed color adjustment function screen to execute the color adjustment process.

FIG. 6A is a diagram illustrating an example of a color adjustment function screen according to the fifth embodiment. The colorimetric methods listed in the control 505 for the colorimetric method are assumed to be displayed by obtaining a colorimetric sensor mounted in a device (Printer-B) selected in the control 501 for the target device from the device information table stored in the device information 305.

FIG. 6B illustrates a state in which the list of the control 505 for the colorimetric method is opened. In the example of FIG. 6A, a device (Printer-B) is selected in the control 501 for the target device. Therefore, from the device information table stored in the device information 305, the colorimetric sensor A and the colorimetric sensor B mounted in Printer-B are displayed.

In step S1505, the color adjustment processing module 302 receives designation of the control 501 for the target device for performing the color adjustment, the control 502 for the adjustment type, the control 503 for the target profile, and the control 505 for the colorimetric method, which are inputted in the color adjustment function screen of FIG. 6A. A request transmitted from the client in response to designation of each of these controls is received by the color adjustment processing module 302 via the communication unit 303.

Next, the processing proceeds to step S1506, and the color adjustment processing module 302 determines whether the received request is designated in the control 505 for the colorimetric method. If the request designates the colorimetric method, the processing proceeds to step S1507, and if not, the processing proceeds to step S1505. In step S1507, the color adjustment processing module 302 obtains paper information managed by the CMS 100. At this time, the color adjustment processing module 302 accesses the paper information 314 to obtain the paper information.

FIG. 17A is a diagram illustrating an example of paper information according to the fifth embodiment.

The paper information 314 stores a paper name and paper attributes. The paper attributes include, for example, information on a paper type, grammage, and size. In the fifth embodiment, the paper name is described in the format of (size: type: grammage), but the paper name may be set to an arbitrary name. In the example of FIG. 17A, four types of paper information are registered. In the paper information 314, paper types can be added and registered from a paper management screen (not shown) of the CMS 100.

Next, the processing proceeds to step S1508, and the color adjustment processing module 302 selects an unchecked type of paper from the paper information 314. At this time, the color adjustment processing module 302 selects one type of paper that has not been checked in step S1509 to step S1511 from the paper information obtained in step S1507. Then the processing proceeds to step S1509, and the color adjustment processing module 302 determines whether or not the type of paper selected in step S1508 can be used in the colorimetric method of the control 505. At this time, the color adjustment processing module 302 accesses the sensor and paper correspondence information 306, and determines whether the paper selected in step S1508 can be used in color adjustment processing using the colorimetric sensor designated in the control 505 for the colorimetric method. For example, assume that the control 505 for the colorimetric method designated in step S1506 is the colorimetric sensor A, and in step S1508, (A4, plain paper, 80 gsm) is selected. With reference to the paper type/grammage relation table in FIG. 7C, it can be seen that the colorimetric sensor A corresponds to the grammage 80 gsm with plain paper. However, with reference to the sheet size relation table in FIG. 7B, it can be seen that the colorimetric sensor A does not correspond to the A4 size. Therefore, in this case, in step S1509, the paper that is A4, plain paper, grammage 80 gsm is determined to be unusable with the designated colorimetric sensor A, and the processing proceeds to step S1511.

Meanwhile, assume that the control 505 for the colorimetric method designated in step S1506 is the colorimetric sensor A, and in step S1508, (A3, plain paper, grammage 128 gsm) is selected. With reference to the paper type/grammage relation table in FIG. 7C, it can be seen that the colorimetric sensor A corresponds to plain paper, grammage 128 gsm. Also, with reference to the sheet size relation table in FIG. 7B, it can be seen that the colorimetric sensor A corresponds to the A3 size. Therefore, in this case, in step S1509, the paper that is A3, plain paper, grammage 128 gsm is determined to be usable with the colorimetric sensor A, and the processing proceeds to step S1510.

In step S1510, the color adjustment processing module 302 displays the type of paper selected in step S1508 as usable in the list of the control 504 for the paper to use, and the processing proceeds to step S1512. The Web page generation module 304 displays the paper selected in step S1508 as a type of paper that can be used for color adjustment in the list of the control 504 for the paper to use. FIG. 6C illustrates a state in which the list of the control 504 for paper to be used is opened. Here, paper 509 which is A3, plain paper, grammage 128 gsm indicates paper that can be used for color adjustment.

Meanwhile, in step S1511, the color adjustment processing module 302 displays the type of paper selected in step S1508 as unusable in the list of the control 504 for the paper to be used, and the processing proceeds to step S1512. The Web page generation module 304 displays the paper selected in step S1508 as a type of paper that is unusable for color adjustment in the list of the control 504 for the paper to be used. The character string "unusable" is added to the end of the paper name for a sheet 510 which is A4 plain paper, grammage 80 gsm of FIG. 6C, which indicates that the sheet is excluded from the selection options. In addition, the system performs control so that this A4, plain paper, grammage 80 gsm paper is not selectable. The addition of "unusable" to the paper name for unusable paper is only an example, and other expressions such as changing the color of the character string may be used as long as it indicates that the sheet cannot be used.

In step S1512, the color adjustment processing module 302 determines whether or not all of the paper information has been checked. Here, the color adjustment processing module 302 determines whether or not the check of step S1509 has been performed for all the types of paper of the paper information 314 obtained in step S1507. If it is determined that all checks have been performed, the processing proceeds to step S1513, and if not, the processing proceeds to step S1508 to check an unchecked type of paper.

In step S1513, the color adjustment processing module 302 receives the designation of the control 504 of the paper to use for performing the adjustment in the color adjustment function screen. A request transmitted in response to designation of each of this control from the client is received by the color adjustment processing module 302 via the communication unit 303. Next, the processing proceeds to step S1514, and the color adjustment processing module 302 determines whether there is a designation of the control 504 for the paper to use in the received request. In the case of a request where the control 504 for the paper to use is designated, the processing proceeds to step S1515, otherwise the processing proceeds to step S1513. In step S1515, the color adjustment processing module 302 determines whether the request received via the communication unit 303 is a press of the OK button 506. In the case of a press of the OK button 506, it is determined to be an instruction for starting execution of the color adjustment job. When the received request is a press of the OK button 506, the processing proceeds to step S1516, the color adjustment function is executed, and the processing ends. On the other hand, in the case of a press of the cancel button 507, the processing proceeds to step S1517, the color adjustment processing is cancelled, and the processing ends.

When the color adjustment function is executed, the color adjustment processing module 302 generates a color adjustment job based on various setting values designated on the color adjustment function screen, and transmits the color adjustment job to the target image forming apparatus 102. The color adjustment processing module 302 generates page information of the color chart by PDF data or the like, creates a job ticket serving as a print setting instruction for the image forming apparatus 102, and transmits the job ticket to the data transceiver module 309 of the information processing apparatus 101 via the communication unit 303 and the network 105. The print job control module 308 of the information processing apparatus 101 analyzes the print job received by the data transceiver module 309, develops the page information of the color chart into a raster image, converts the print setting instructed by the job ticket into a command for the image forming apparatus 102, and transmits the command to the data transceiver module 313 of the image forming apparatus 102. In the image forming apparatus 102, the print processing module 311 analyzes the raster image and the command received by the data transceiver module 313, and the image forming apparatus 102 performs printing of a color chart page and a colorimetry process using a designated colorimetric sensor.

Figure 9:
FIG. 9 is a diagram illustrating an example of a job ticket generated by the color adjustment processing module according to a fifth embodiment.

FIG. 9 is a diagram illustrating an example of a job ticket generated by the color adjustment processing module 302 of the CMS 100 according to the fifth embodiment.

Reference numeral 901 designates information on the paper to use, and reference numeral 902 designates information on a colorimetric sensor to use. At the reference numeral 901, the A3 size is designated as the paper (MediaSize) to use. In reference numeral 902, a colorimetric sensor A (ColorMeasurement Sensor A) is designated as a colorimetric sensor (MeasurementMethod) to use. Upon receiving the print instruction, the image forming apparatus 102 performs control such that the colorimetry process is executed using the colorimetric sensors A214 of the print unit main body 210 based on the job ticket.

As described above, by virtue of the fifth embodiment, it is possible to present available colorimetric sensors according to the paper to use in the color adjustment function. Therefore, the user does not need to be aware of the sheet restrictions of the colorimetric sensor, and can easily select the paper to be used in the color adjustment process that uses the designated colorimetric sensor.

Sixth Embodiment

Next, a sixth embodiment of the present invention will be described. Note that description of configurations that are identical to those of the fifth embodiment is omitted. In the sixth embodiment, the process of changing the priority of the colorimetric sensor to use according to a parameter designated when the color adjustment function is executed will be described.

Figure 16B:
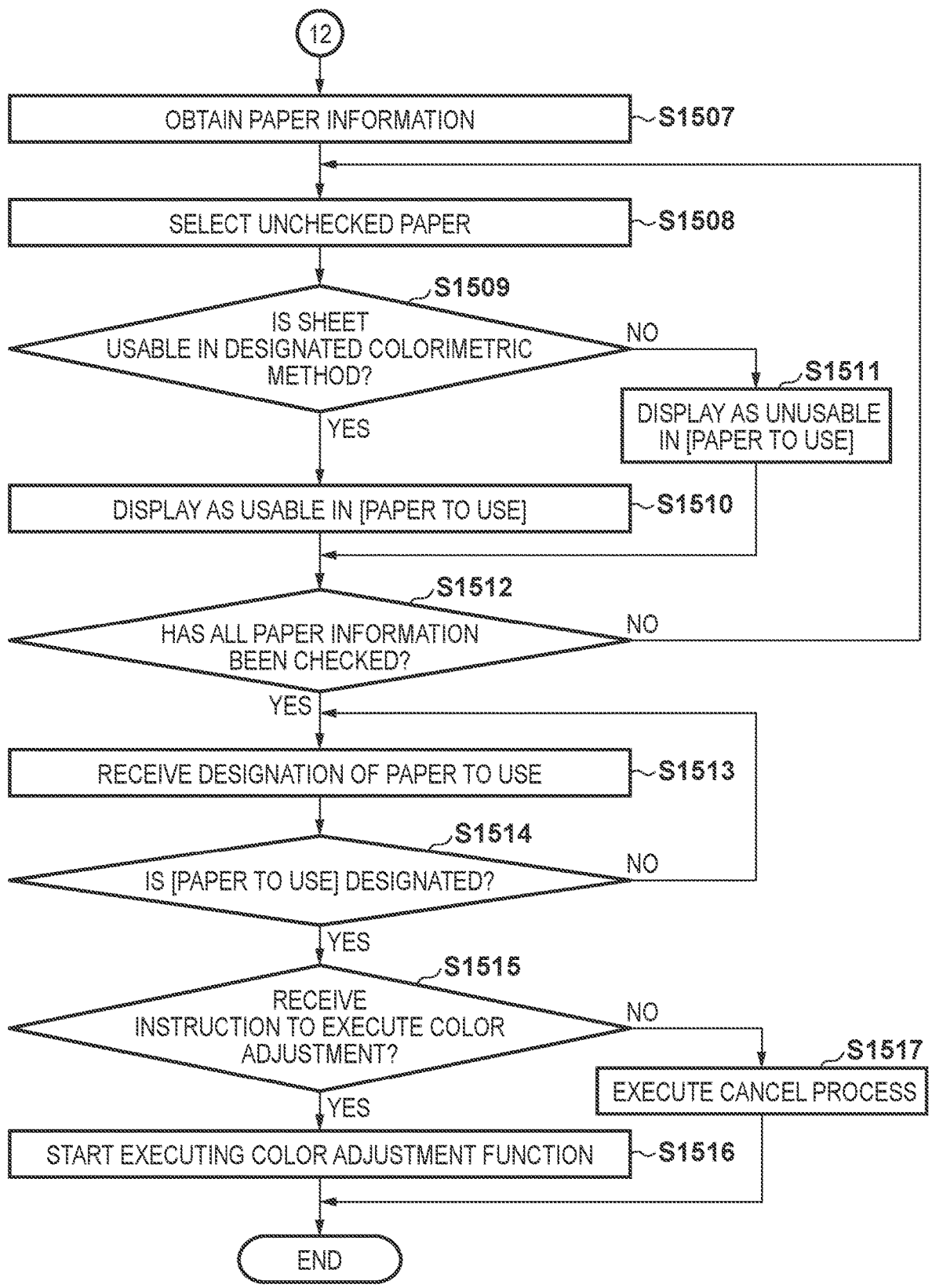

FIGS. 16A and 16B are flowcharts for describing a process for executing a color adjustment job by the color management system according to the sixth embodiment. In FIGS. 16A and 16B, the same reference numerals are used for processing that is identical to that of above-described FIGS. 4A and 4B and FIGS. 15A and 15B and description thereof is omitted.

In step S1601, the color adjustment processing module 302 receives the designation of the colorimetry mode in addition to the target device and the colorimetric method on the color adjustment function screen.

In an example of a color adjustment function screen according to the sixth embodiment, similarly to the above-described FIG. 12A, the control 1201 for the colorimetry mode is added. In this colorimetry mode, an operation mode for when the colorimetric sensor of the image forming apparatus 102 measures a color chart can be designated. In the sixth embodiment, it is assumed that "standard" and "speed priority" can be selected. In the example of FIG. 12A, "speed priority" is designated. A request transmitted from the client in response to designation of each of these controls is received by the color adjustment processing module 302 via the communication unit 303.

In step S1602, the color adjustment processing module 302 determines whether there is a designation of the control 1201 for the colorimetry mode in the received request. In the case of a request where the control 1201 for the colorimetry mode is designated, the processing proceeds to step S1603, and otherwise the processing proceeds to step S1601. In step S1603, the color adjustment processing module 302 acquires a sensor priority table. This the sensor priority table is similar to that of FIG. 12B according to the third embodiment described above, for example.

In the sensor priority table, the priority of the colorimetric sensor corresponding to the colorimetry mode (the numerical value "1" is assumed to be the highest priority) is defined. In the standard mode, the colorimetric sensor B has priority 1 and the colorimetric sensor A has priority 2, and in the speed priority mode, the colorimetric sensor A has priority 1 and the colorimetric sensor B has priority 2. As described above, although the colorimetric sensors A have a high speed of colorimetry due to the arrangement position in the image forming apparatus and the number of sensors, it has a property of inferior accuracy. On the other hand, although the colorimetric sensor B has high colorimetric accuracy, the speed of colorimetry suffers therewith. Standard mode is defined such that colorimetry accuracy is prioritized and the colorimetric sensor B is used preferentially, and speed priority mode is defined such that speed is prioritized and the colorimetric sensor A is used preferentially.

The processing proceeds to step S1604, and the color adjustment processing module 302 designates the colorimetric sensor to be used in the color adjustment in the control 505 for the colorimetric method in accordance with the priorities of the colorimetric sensors obtained in step S1603. Here, when speed priority is indicated in step S1602, the colorimetric sensor A is preferentially selected.

As described above, by virtue of the sixth embodiment, it is possible to automatically select the colorimetric sensor used in the color adjustment function in accordance with the colorimetry parameter, and to present a sheet usable by the automatically selected colorimetric sensor. In the sixth embodiment, an example in which the priority is changed according to the parameter "speed priority" has been described, but the present invention is not limited to this parameter, and the priority of the colorimetric sensor may be defined according to a designated parameter and the selection may be switched based thereupon.

Seventh Embodiment

A seventh embodiment of the present invention will be described. Note that description of configurations that are identical to those of the fifth embodiment and the sixth embodiment is omitted. In the seventh embodiment, a process of providing a mode for reducing the number sheets of paper to be used in chart printing, automatically selecting a colorimetric sensor to be used according to the mode, and presenting paper corresponding to the selected colorimetric sensor will be described.

FIG. 17E is a diagram illustrating an example of a paper reduction mode selection screen according to the seventh embodiment.

This screen is displayed on a setting management screen (not shown) of the CMS 100. A radio button 1702 is a radio button for enabling the paper reduction mode, and a radio button 1703 is a radio button for disabling the paper reduction mode. FIG. 17E illustrates an example of a screen in which ON (enable paper reduction mode) is selected. An OK button 1704 is a button for applying the setting of this screen, and a cancel button 1705 is a button for canceling the setting of this screen. Configuration may be such that this screen is set from the color adjustment function screen of FIG. 12A.

Figure 18A:
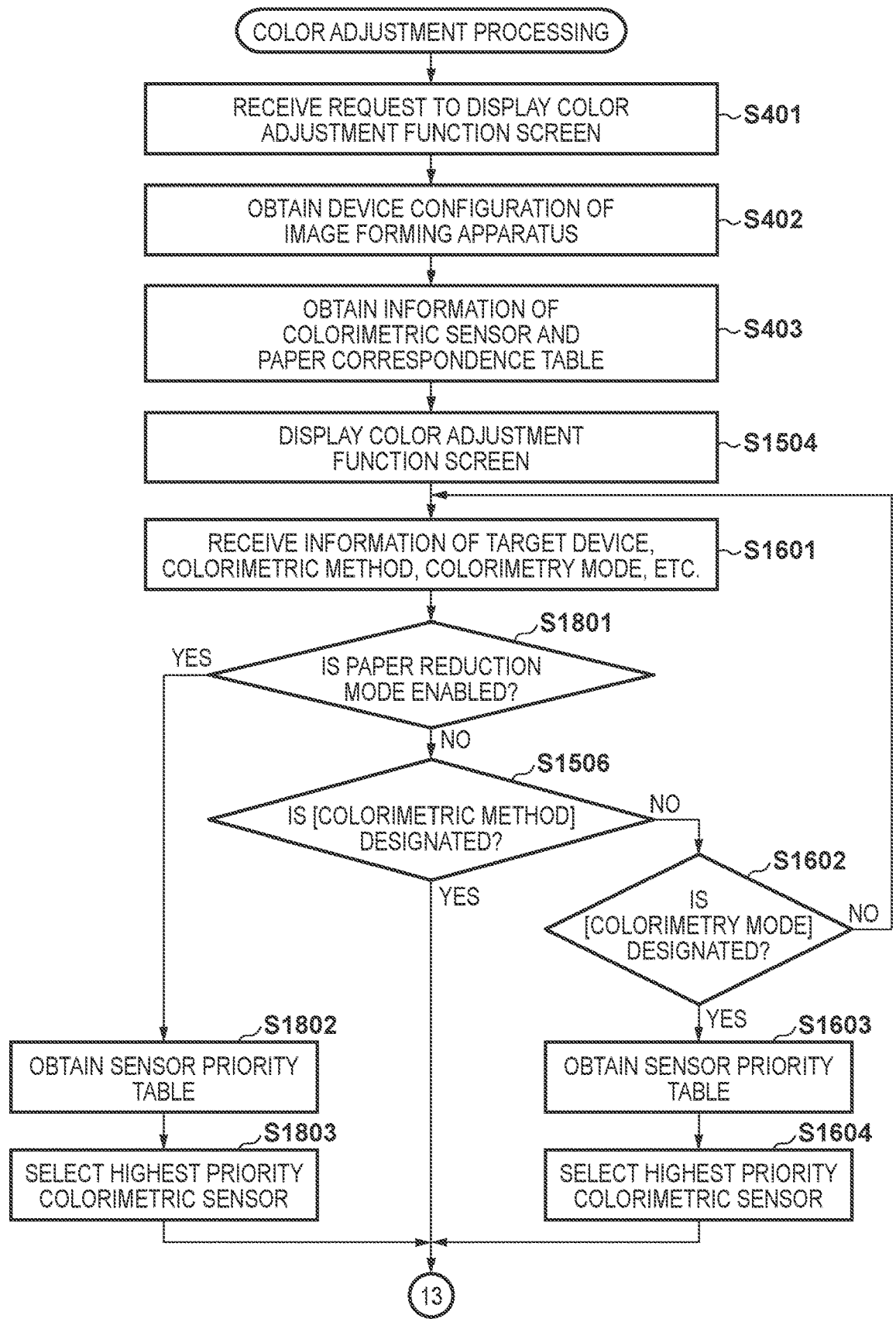
FIGS. 18A and 18B are flowcharts for describing a process for executing a color adjustment job by the color management system according to the seventh embodiment.
Figure 18B:
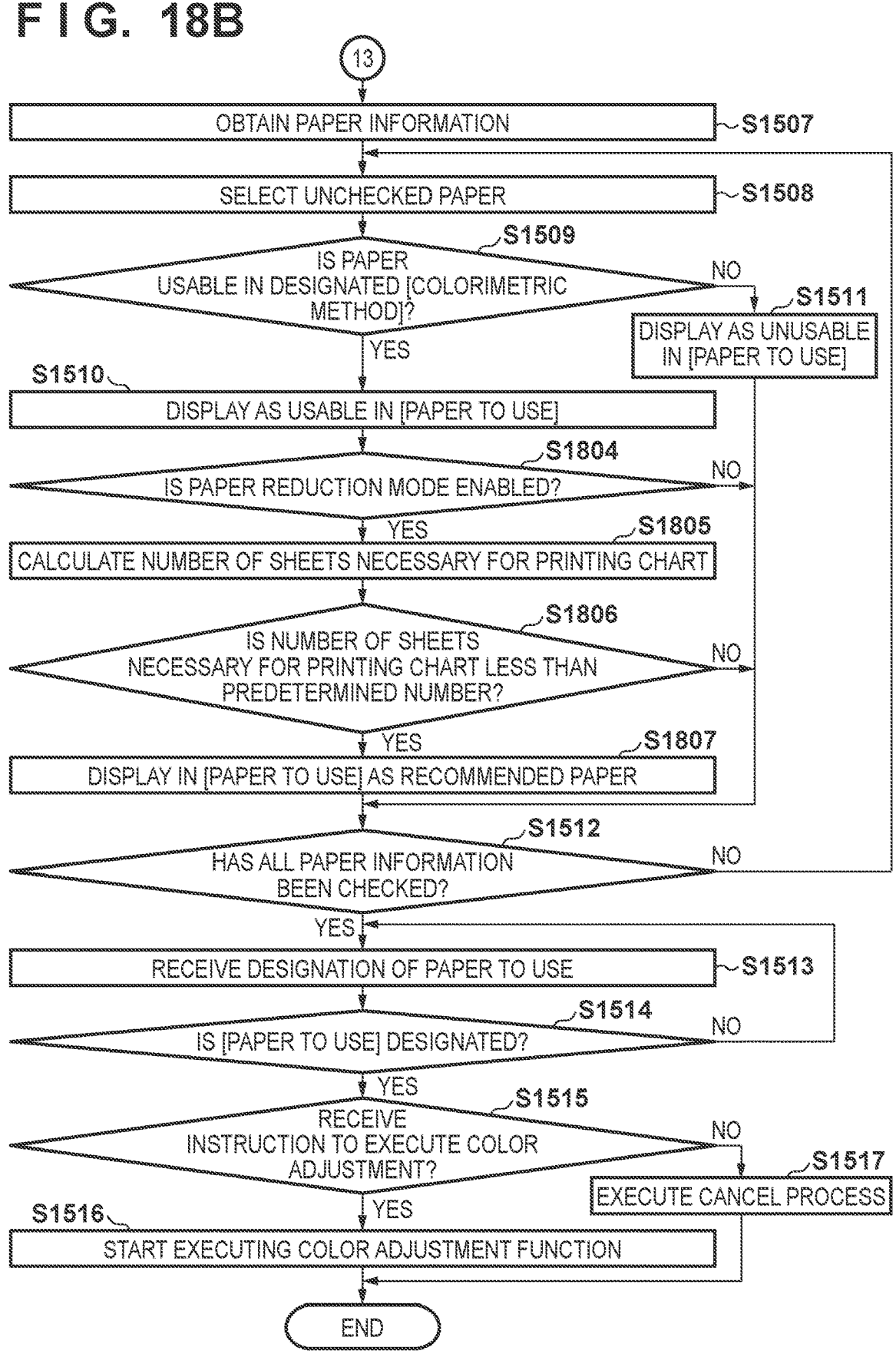

FIGS. 18A and 18B are flowcharts for describing a process for executing a color adjustment job by the color management system according to the seventh embodiment. In FIGS. 18A and 18B, the same reference numerals are used for processing that is identical to that of above-described FIGS. 4A and 4B, FIGS. 15A and 15B, and FIGS. 16A and 16B and description thereof is omitted.

In step S1801, the color adjustment processing module 302 determines whether or not the paper reduction mode is enabled. If the paper reduction mode is enabled, the process proceeds to step S1802; otherwise, the processing proceeds to step S1506. In step S1802, the color adjustment processing module 302 obtains a sensor priority table.

FIG. 7D is a diagram illustrating a number of patches relation table according to the seventh embodiment. This table indicates the number of patches that each colorimetric sensor can embed per sheet of each paper size. For example, the table indicates that for colorimetric sensor A, 76 patches are embedded for A3 and for colorimetric sensor B, 288 patches are embedded for A3. As described above, since the colorimetric sensor A is fixed and the colorimetric sensor B is movable, the layout of the colorimetry chart is also different. Since patches can be embedded more evenly over one sheet in the case of the colorimetric sensor B, which is of a movable type, a larger number of patches that can be embedded per sheet with the colorimetric sensor B even with the same paper size.

FIG. 17B is a diagram illustrating an example of a sensor priority table according to the seventh embodiment. In this example, the paper reduction mode is added to the sensor priority table of FIG. 12B. As described above, the number of patches that can be embedded per sheet is larger when the colorimetric sensor B is used even with the same paper size. Therefore, when the paper reduction mode is enabled, the colorimetric sensor B is given priority 1 and the colorimetric sensor A is given priority 2. When the paper reduction mode is disabled, the colorimetric sensor A is given priority 1 and the colorimetric sensor B is given priority 2. The priorities being the same indicates that the priority of the colorimetric sensor is not determined depending on the mode.

In step S1803, the color adjustment processing module 302 designates the colorimetric sensor to be used in the color adjustment in the control 505 for the colorimetric method in accordance with the priorities of the colorimetric sensors acquired in step S1802. In a case where "enable paper reduction mode" is instructed in step S1802, the colorimetric sensor B is preferentially selected. In step S1804, the color adjustment processing module 302 determines whether or not the paper reduction mode is enabled. If the paper reduction mode is enabled, the process proceeds to step S1805; otherwise, the processing proceeds to step S1512. In step S1805, the color adjustment processing module 302 calculates the number of sheets of paper required for printing the chart. At this time, the color adjustment processing module 302 refers to a number of patches relation table from the sensor and paper correspondence information 306, and obtains the number of patches that can be embedded per sheet with the type of paper selected in step S1508 in the colorimetric sensor selected in step S1803. For example, in a case where the colorimetric sensor B is selected in step S1803 and (A3: plain paper, grammage 128 gsm) is selected in step S1508, it can be seen that 288 patches per sheet can be embedded from the number of patches relation table in FIG. 7D. Further, the color adjustment processing module 302 determines the chart layout from the control 502 for the adjustment type and the control 503 for the target profile, and determines the number of patches required for chart printing. Further, the color adjustment processing module 302 calculates the number of sheets required for chart printing from the above-described number of patches that can be embedded per sheet and the number of patches required for adjustment. For example, assume that the target profile (color inspection: Japan Color 2011) requires printing of a chart of 2000 patches. For the above-mentioned paper (A3, plain paper, grammage 128 gsm), 288 patches can be embedded per sheet, so it can be seen that seven sheets are required to print 2000 patches.

In step S1806, the color adjustment processing module 302 determines whether or not the number of sheets required to print the number of charts calculated in step S1805 is less than a predetermined number. The color adjustment processing module 302 stores the minimum required number of sheets; the color adjustment processing module 302 determines that the number of sheets required to print the number of charts calculated is "less than" when the minimum value is updated. If the number of sheets is determined to be less than the predetermined number, the process proceeds to step S1807; otherwise, the processing proceeds to step S1512. In the seventh embodiment, a minimum value method is described, but configuration may be such that a range of allowable values are held such that "less than" is determined from the minimum value until the Nth value, or a threshold value for the number of sheets of paper may be set, and "less than" is determined for numbers that are below the threshold value.

In step S1807, the color adjustment processing module 302 displays the paper as a recommended type of paper in the list of the control 504 for the paper to be used. Specifically, in step S1807, the Web page generation module 304 displays the sheet selected in step S1508 as a recommended type of paper in the list of the control 504 for the paper to be used.

FIG. 6D illustrates a state in which a list of the control 504 for paper to be used in a seventh embodiment is open. The text "recommended" is added to the end of the paper name of A3: plain paper, 128 gsm 511, indicating that usage of that paper is recommended.

If the determination method is the minimum value method in step S1806, the text "recommended" is removed from types of paper for which the required number of sheets is not the minimum value. The addition of "recommended" to the paper name for a recommended paper type is only an example, and other expressions such as changing the color of the character string may be used as long as it indicates that the sheet is recommended.

As described above, by virtue of the seventh embodiment, it is possible to provide a mode for reducing the number of sheets of paper to be used in chart printing, to automatically select a colorimetric sensor to be used in accordance with the mode, and to present types of paper requiring less sheets to print the chart.

Eighth Embodiment

An eighth embodiment of the present invention will be described. Note that description of configurations that are identical to those of the fifth embodiment is omitted. In the eighth embodiment, a description will be given of a process of limiting the presented types of paper to a paper that is stored in a paper feed source of the image forming apparatus to be connected.

Figure 19A:
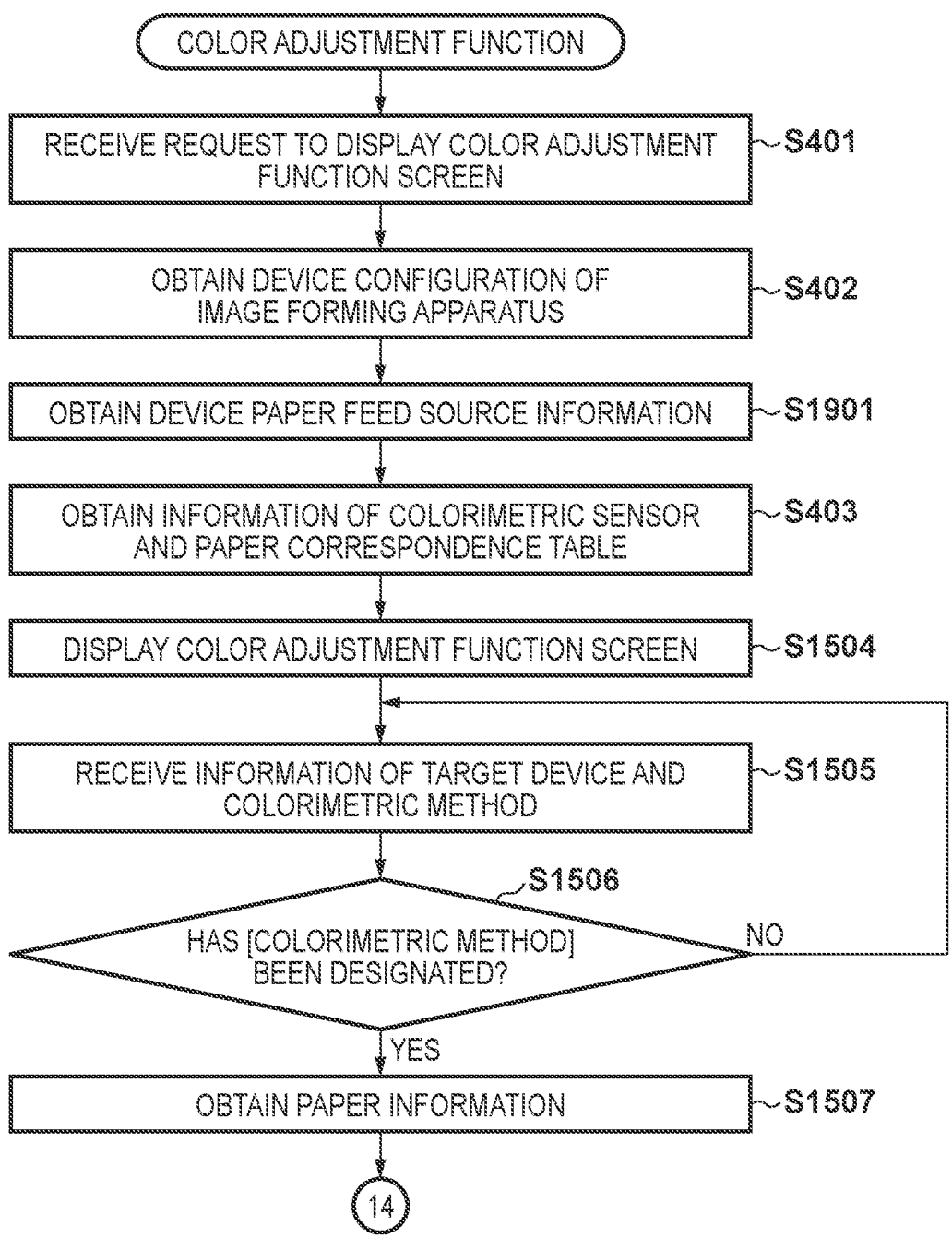
FIGS. 19A and 19B are flowcharts for describing a process for executing a color adjustment job by the color management system according to the eighth embodiment.
Figure 19B:
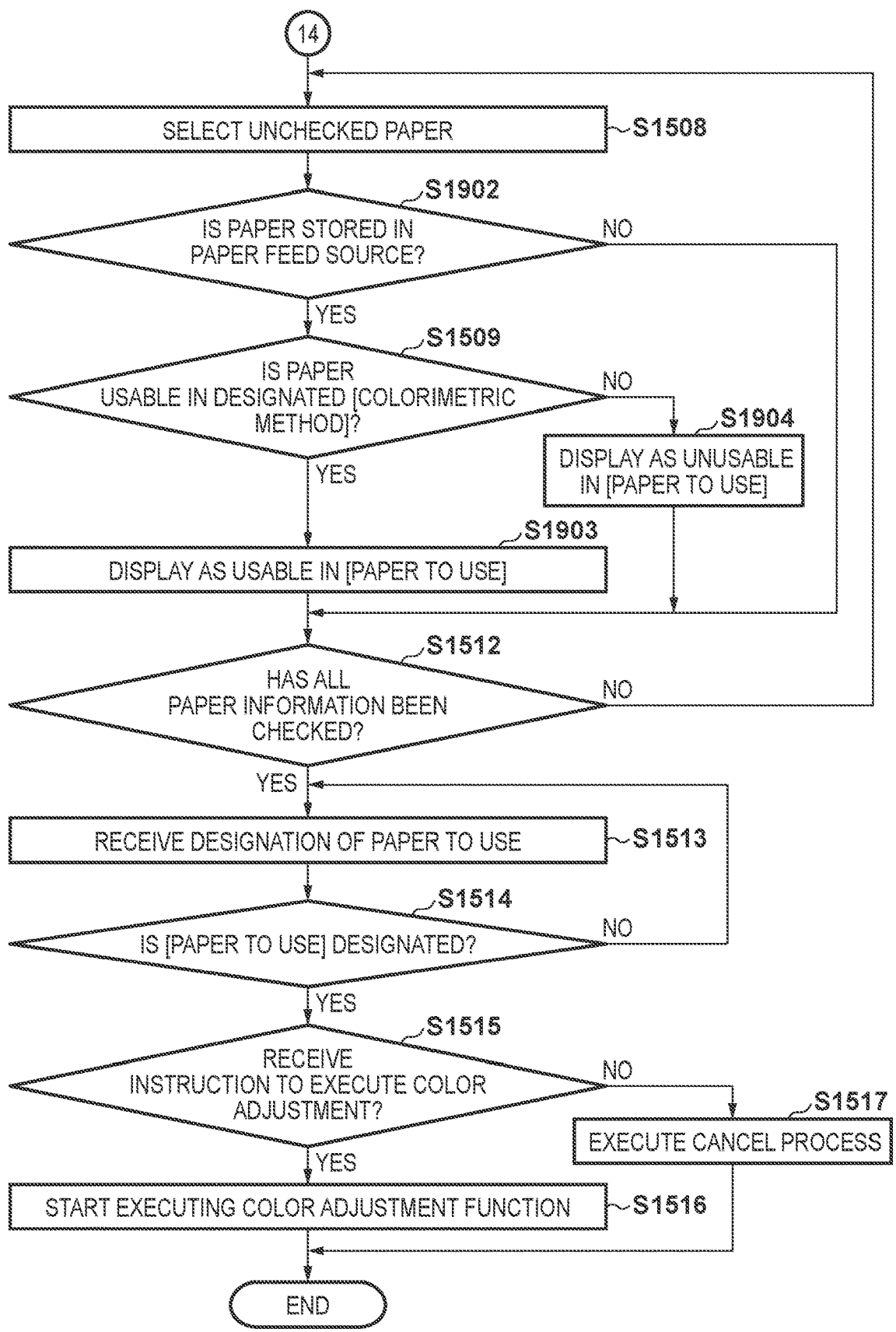

FIGS. 19A and 19B are flowcharts for describing a process for executing a color adjustment job by the color management system according to the eighth embodiment. In FIGS. 19A and 19B, the same reference numerals are used for processing that is identical to that of above-described FIGS. 4A and 4B and FIGS. and 15B and description thereof is omitted.

In step S1901, the device management unit 301 obtains the paper feed source information of the target image forming apparatus 102. The device management unit 301 transmits a request to obtain the paper feed source information of the image forming apparatus 102 via the communication unit 303 to the data transceiver module 309 of the information processing apparatus 101 through the network 105. The data transceiver module 309 of the information processing apparatus 101 analyzes the received request and transmits a command for obtaining paper feed source information to the device information management unit 312 of the image forming apparatus 102. The device information management unit 312 returns the paper feed source information in response to the received command. The device management unit 301 of the CMS 100 receives the paper feed source information returned from the device information management unit 312, and adds the paper feed source information to the device information table of the device information 305.

FIG. 17C is a diagram illustrating an example of the device information table according to the eighth embodiment, and illustrates an example in which the paper feed source information is added to the device information table of the FIG. 7A. It is indicated that in cassette 1 of Printer-A, (A4: plain paper, 80 gsm) is stored, in cassette 2 of Printer-A, (A4: coated, 80 gsm) is stored, in cassette 1 of Printer-B, (A3: bond paper, 180 gsm) is stored, and in the cassette 2 of Printer-B, (A3: plain paper, 128 gsm) is stored.

Next, in step S1902, the color adjustment processing module 302 refers to the device information table obtained in step S1901 in response to the designation of the control of the target image forming apparatus 102, and determines whether the sheet selected in step S1508 is stored in the paper feed source of the image forming apparatus 102. In a case where the paper is stored in the paper feed source, the process proceeds to step S1509; otherwise, the processing proceeds to step S1512. In step S1903, the color adjustment processing module 302 displays the type of paper as usable in the list of the control 504 for the paper to be used, and further displays the paper feed source in which the paper is stored. At this time, the Web page generation module 304 displays the paper selected in step S1508 as a type of paper that can be used for color adjustment in the list of the control 504 for the paper to be used. In addition, a paper feed source determined to be storing the sheet in step S1902 is also displayed.

FIG. 17D is a diagram illustrating an opened list of the control 504 for paper to be used in the eighth embodiment. (A3: plain paper, 128 gsm [cassette 2]) 1701 is a type of paper that can be used in color adjustment, and it is indicated that this paper is stored in the cassette 2.

Meanwhile, in step S1904, the paper is displayed as unusable in the list of the control 504 for the paper to use, and information on the paper feed source in which the paper is stored is further displayed. The Web page generation module 304 displays the paper selected in step S1508 as a type of paper that is unusable for color adjustment in the list of the control 504 for the paper to use. In addition, the paper feed source determined to be storing the sheet in step S1902 is also displayed. In (A3: bond paper, 180 gsm [cassette 1] [unusable]) 1706 of FIG. 17D, the text "unusable" is added to the end of the paper name to indicate that the paper is excluded from the selection options. In addition, the paper feed source determined to be storing the sheet in step S1902 is also displayed. In addition, control is performed by the system so that (A3: bond paper, 180 gsm [cassette 1] [unusable]) cannot be selected.

As described above, by virtue of the eighth embodiment, it is possible to select paper to be used in the color adjustment function from among the types of paper stored in the paper feed sources of the target device. Since it is possible to designate a paper that is stored in a paper feed source by this processing, it is possible to select the type of paper without making an error.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-072674, filed Apr. 26, 2022, which is hereby incorporated by reference herein in its entirety.

What is claimed is:

1. A color management system including a server and an image forming apparatus,
    the server comprising
    one or more first memories storing instructions; and
    one or more first processors configured to execute the instructions to:
        store information of a colorimetric sensor and paper information corresponding to the colorimetric sensor;
        obtain information of a colorimetric sensor mounted in the image forming apparatus;
        designate paper to use when executing a color adjustment process of the image forming apparatus; and
        based on the stored paper information, select a colorimetric sensor of the image forming apparatus corresponding to the designated paper, and
    the image forming apparatus comprises
    at least one colorimetric sensor;
    a printer engine;
    one or more second memories storing instructions; and
    one or more second processors configured to execute the instructions to:
        cause the printer engine to print a chart on the designated paper in accordance with a color adjustment job for executing the color adjustment process; and
        measure a colorimetric value of the printed chart using the selected colorimetric sensor.

2. The color management system according to claim 1, wherein in the selection of the colorimetric sensor, the one or more first processors display a list of colorimetric sensors and allow a user to select a colorimetric sensor therefrom, and display a colorimetric sensor of the image forming apparatus that does not correspond to the designated paper in a state that the colorimetric sensor of the image forming apparatus is not able to be selected in the list.

3. The color management system according to claim 2, wherein in the selection of the colorimetric sensor, the one or more first processors display a colorimetric sensor that is mounted in the image forming apparatus but unusable as unselectable in the list.

4. The color management system according to claim 1, wherein in the selection of the colorimetric sensor, in a case where a colorimetric sensor corresponding to the designated paper is not mounted in the image forming apparatus, the one or more first processors select a manual colorimeter.

5. The color management system according to claim 1, wherein in the selection of the colorimetric sensor, in a case where a plurality of colorimetric sensors corresponding to the designated paper are mounted in the image forming apparatus, the one or more first processors select the colorimetric sensor based on priorities of the plurality of colorimetric sensors.

6. The color management system according to claim 5, wherein the one or more first processors are configured to further execute the instructions to set a colorimetry mode of the color adjustment process; and
the one or more first processors are configured to further execute the instructions to, in the selection of the colorimetric sensor, select a colorimetric sensor of the image forming apparatus based on priorities of the plurality of colorimetric sensors which accord with the set colorimetry mode.

7. The color management system according to claim 1, wherein the one or more first processors are configured to further execute the instructions to obtain information of papers stored in a plurality of paper feed sources of image forming apparatus; and
the one or more first processors are configured to further execute the instructions to, in the designation of the paper, designate the paper to use from among papers stored in the plurality of paper feed sources of the image forming apparatus based on the obtained information.

8. An information processing apparatus operable to control a color adjustment process by an image forming apparatus having a plurality of colorimetric sensors, the information processing apparatus comprising
one or more memories storing instructions; and
one or more processors configured to execute the instructions to:
store information of a colorimetric sensor and paper information corresponding to the colorimetric sensor;
obtain information of the plurality of colorimetric sensors, which are mounted in the image forming apparatus;
designate paper to use when executing the color adjustment process of the image forming apparatus; and
based on the stored paper information, select a colorimetric sensor of the image forming apparatus corresponding to the designated paper.

9. The information processing apparatus according to claim 8, wherein the one or more processors are configured to further execute the instructions to, in the selection of the colorimetric sensor, display a list of the plurality of colorimetric sensors and allow a user to select a colorimetric sensor therefrom, and display a colorimetric sensor of the image forming apparatus that does not correspond to the paper to use in a state that the colorimetric sensor of the image forming apparatus is not able to be selected in the list.

10. The information processing apparatus according to claim 9, wherein the one or more processors are configured to further execute the instructions to, in the selection of the colorimetric sensor, display a colorimetric sensor that is mounted in the image forming apparatus but unusable as unselectable in the list.

11. The information processing apparatus according to claim 8, wherein the one or more processors are configured to further execute the instructions to, in a case where a colorimetric sensor corresponding to the designated paper is not mounted in the image forming apparatus, in the selection of the colorimetric sensor, further select a manual colorimeter.

12. The information processing apparatus according to claim 8, wherein the one or more processors are configured to further execute the instructions to, in a case where a plurality of colorimetric sensors corresponding to the designated paper to use are mounted in the image forming apparatus, in the selection of the colorimetric sensor, select the colorimetric sensor based on priorities of the plurality of colorimetric sensors.

13. The information processing apparatus according to claim 12, wherein the one or more processors are configured to further execute the instructions to set a colorimetry mode of the color adjustment process, and
the one or more processors are configured to further execute the instructions to, in the selection of the colorimetric sensor, select a colorimetric sensor of the image forming apparatus based on priorities of the plurality of colorimetric sensors which accord with the set colorimetry mode.

14. The information processing apparatus according to claim 8, wherein the one or more processors are configured to further execute the instructions to obtain information of papers stored in a plurality of paper feed sources of the image forming apparatus, and
the one or more processors are configured to further execute the instructions to, in the designation of the paper, designate the paper to use from among papers stored in the plurality of paper feed sources of the image forming apparatus.

15. An information processing apparatus operable to control a color adjustment process by an image forming apparatus having a plurality of colorimetric sensors, the information processing apparatus comprising
one or more memories storing instructions; and
one or more processors configured to execute the instructions to:
store information of a colorimetric sensor and paper information corresponding to the colorimetric sensor;
designate a colorimetric sensor to use when executing the color adjustment process of the image forming apparatus; and
based on the stored paper information, select paper to use in the color adjustment process using the designated colorimetric sensor.

16. The information processing apparatus according to claim 15, wherein the one or more processors are configured to further execute the instructions to, in the selection of the paper, display a list of paper and allow a user to select therefrom, and display paper that does not correspond to the designated colorimetric sensor in a state that the paper is not able to be selected in the list.

17. The information processing apparatus according to claim 15, wherein the one or more processors are configured to further execute the instructions to set a colorimetry mode of the color adjustment process, and
the one or more processors are configured to further execute the instructions to, in the designation of the colorimetric sensor, designate a colorimetric sensor of the image forming apparatus based on priorities of the plurality of colorimetric sensors which accord with the set colorimetry mode.

18. A non-transitory computer-readable storage medium storing a program for causing a computer to execute a control method of controlling an information processing apparatus operable to control a color adjustment process by an image forming apparatus having a plurality of colorimetric sensors, the method comprising:
- obtaining information of the plurality of colorimetric sensors, which are mounted in the image forming apparatus;
- designating paper to use when executing the color adjustment process of the image forming apparatus; and
- based on stored information of a colorimetric sensor and paper information corresponding to the colorimetric sensor, selecting a colorimetric sensor of the image forming apparatus corresponding to the designated paper.

19. A non-transitory computer-readable storage medium storing a program for causing a computer to execute a control method of controlling an information processing apparatus operable to control a color adjustment process by an image forming apparatus having a plurality of colorimetric sensors, the method comprising:
- designating a colorimetric sensor to use when executing the color adjustment process of the image forming apparatus; and
- based on stored information of a colorimetric sensor and paper information corresponding to the colorimetric sensor, selecting paper to use in the color adjustment process using the designated colorimetric sensor.

* * * * *